United States Patent [19]
Inada et al.

[11] Patent Number: 5,237,399
[45] Date of Patent: Aug. 17, 1993

[54] LIQUID CRYSTAL COLOR PROJECTION APPARATUS FOR MODIFYING AND PROJECTING DISPLAY IMAGES OBTAINED FROM LIQUID CRYSTAL PANELS

[75] Inventors: Tomohide Inada; Kazuaki Wakatsuki; Tsuneyuki Horii, all of Tokyo, Japan

[73] Assignee: Nippon Avionics Co., Ltd., Japan

[21] Appl. No.: 737,456

[22] Filed: Jul. 29, 1991

[30] Foreign Application Priority Data

| Jul. 31, 1990 | [JP] | Japan | 2-201169 |
| Nov. 7, 1990 | [JP] | Japan | 2-299857 |
| Feb. 26, 1991 | [JP] | Japan | 3-053209 |
| May 1, 1991 | [JP] | Japan | 3-126565 |
| Jun. 24, 1991 | [JP] | Japan | 3-177810 |
| Jun. 25, 1991 | [JP] | Japan | 3-179004 |

[51] Int. Cl.$^5$ .......................... H04N 5/74; H04N 9/31
[52] U.S. Cl. .......................... 358/60; 358/236
[58] Field of Search ............... 358/60, 231, 236, 199, 358/204, 206; 353/122, 69

[56] References Cited

U.S. PATENT DOCUMENTS

| 4,692,808 | 9/1987 | Chism, Jr. | 358/231 |
| 4,722,593 | 2/1988 | Shimakazi | 353/69 |
| 4,904,061 | 2/1990 | Aruga | 353/122 X |
| 4,943,145 | 7/1990 | Miyata | 358/199 |
| 4,978,202 | 12/1990 | Yang | 358/231 X |
| 5,032,924 | 7/1991 | Brown et al. | 358/231 |
| 5,037,196 | 8/1991 | Takafuji et al. | 353/122 |

Primary Examiner—James J. Groody
Assistant Examiner—Mark R. Powell
Attorney, Agent, or Firm—Blakely, Sokoloff, Taylor & Zafman

[57] ABSTRACT

A liquid crystal color projection apparatus includes a light source, dichroic mirrors, transmission type liquid crystal panels, a beam mixing section, two parallel side plates, and bar members. The dichroic mirrors separate light, supplied from the light source, into red, green, and blue beams. The transmission type liquid crystal panels are respectively arranged on the optical paths of the three color beams separated by the dichroic mirrors so as to form images corresponding to the three color beams. The beam mixing section mixes image beams from the transmission liquid crystal panels to reproduce a color image. The side plates have plural pairs of engaging portions, arranged at symmetrical positions, for fixing the dichroic mirrors and the liquid crystal panels at predetermined positions. Each of the bar members has two end portions fixed to one pair of engaging portions of the side plates, thus fixing and holding two arbitrary end portions of each of the dichroic mirrors and the liquid crystal panels thereon.

29 Claims, 15 Drawing Sheets

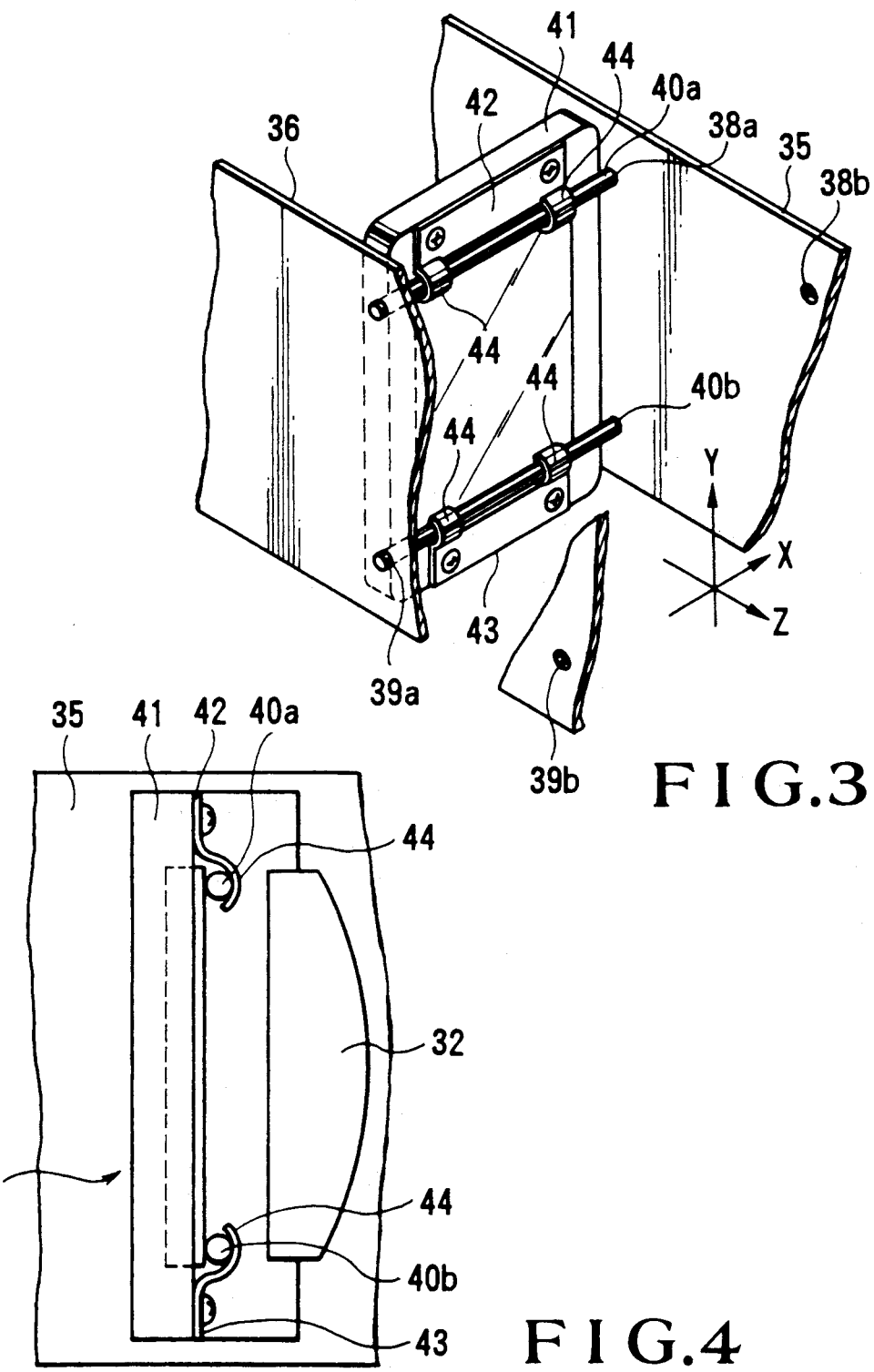

|  | REFLECTION COUNT | TRANSMISSION COUNT |
|---|---|---|
| BLUE BEAM (B) | 1 | 1 |
| RED BEAM (R) | 2 | 1 |
| GREEN BEAM (G) | 0 | 1 |

| | REFLECTION COUNT | TRANSMISSION COUNT |
|---|---|---|
| BLUE BEAM (B) | 0 | 2 |
| RED BEAM (R) | 1 | 1 |
| GREEN BEAM (G) | 1 | 0 |
F I G. 24
PRIOR ART
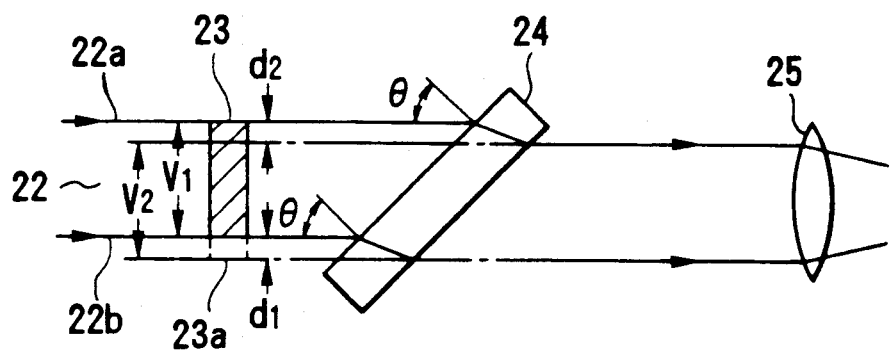
F I G. 25
PRIOR ART
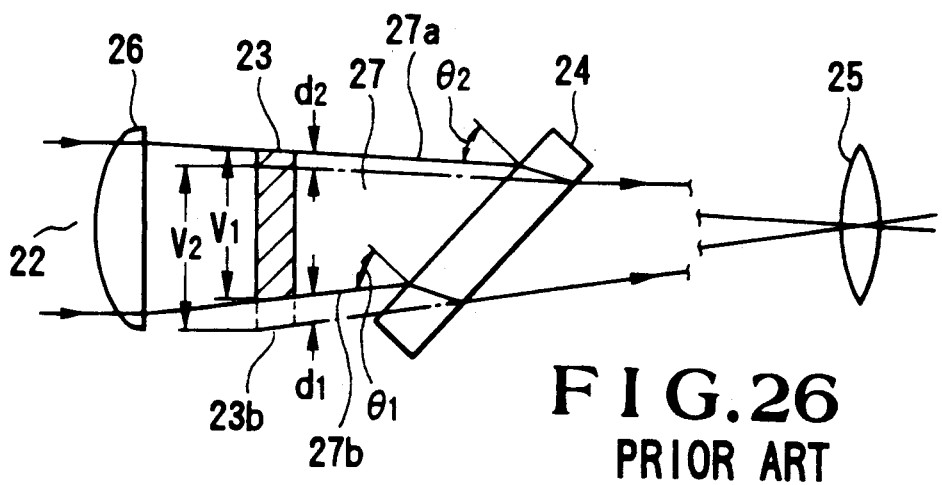
F I G. 26
PRIOR ART

LIQUID CRYSTAL COLOR PROJECTION APPARATUS FOR MODIFYING AND PROJECTING DISPLAY IMAGES OBTAINED FROM LIQUID CRYSTAL PANELS

BACKGROUND OF THE INVENTION

The present invention relates to a liquid crystal color projection apparatus using liquid crystal panels and, more particularly, to a liquid crystal color projection apparatus for adding/mixing display images respectively obtained by R, G, and B liquid crystal panels and projecting a resulting image.

With recent remarkable advances in techniques of liquid crystal displays, liquid crystal panels exhibiting excellent contrast and color reproduction characteristics have been developed. As a result, a liquid crystal projection apparatus constituted by a color liquid crystal panel as an image display carrier and designed to enlarge/project an image on a large screen has been put into practice. In a liquid crystal color projection apparatus of this type, light from a light source is focused by a focusing optical system to form a substantially parallel beam, the parallel beam is radiated on a transmission type color liquid crystal panel, and a transmitted beam is enlarged/projected on a screen through a projecting optical system. A currently available color liquid crystal panel has 70,000 to 90,000 pixels. If, therefore, one picture element consists of red (R), green (G), and blue (B) pixels, the number of picture elements of the color liquid crystal panel corresponds to ⅓ that of pixels. Such a color liquid crystal panel cannot be properly applied to a large screen because of a low pixel density.

In order to solve the problem of a low pixel density in the application of a liquid crystal panel, the following scheme has been proposed and put into practice. In this scheme, three liquid crystal panels are used. R, G, and B beams are respectively radiated on these liquid crystal panels through dichroic mirrors for separating (obtaining spectral components) white light, supplied from a light source, into R, G, and B beams. A large number of pixels of each liquid crystal panel are then turned on and off to produce R, G, and B images. These images are mixed with each other by a dichroic prism (prism system) or a dichroic mirror (mirror system) to reproduce a color image on a large screen through a projecting optical system. These conventional apparatuses will be described below with reference to FIG. 23.

FIG. 23 shows a liquid crystal color projection apparatus called a mirror system, which uses a dichroic mirror for color separation and mixing of light. Referring to FIG. 23, reference numeral 1 denotes a light source such as a xenon lamp. Light radiated from the light source 1 is reflected by a total reflection mirror 2 and is focused by a focusing optical system 3 to become a substantially parallel beam. The parallel beam is then incident on a blue dichroic mirror 4 for separating/reflecting only a blue beam. A blue beam 5 separated by the blue dichroic mirror 4 is reflected by a mirror 6 in a direction parallel to the optical axis of the focusing optical system 3 to be incident on a transmission type liquid crystal panel 7. Voltages are selectively applied to the liquid crystal panel 7 in accordance with the constituent pixels of an arbitrary image to be projected. As a result, the blue beam 5 transmitted through the liquid crystal panel 7 becomes a blue image beam 5a including a video signal.

The light, from which the blue beam 5 is separated by the blue dichroic mirror 4, is transmitted through the mirror 4 to become a yellow beam 8. When the yellow beam 8 is incident on a red dichroic mirror 9, a red beam 10 is separated. A remaining green beam 11 is transmitted through the mirror 9. The separated red beam 10 is incident on a transmission type liquid crystal panel 12 having the same arrangement as that of the liquid crystal panel 7 to become a red image beam 10a. The blue and red image beams 5a and 10a are mixed with each other by a mixing dichroic mirror 13 to form a magenta image beam 14.

The green beam 11 is also incident on a transmission type liquid crystal panel 15 having the same arrangement as that of the liquid crystal panel 7 to become a green image beam 11a. The green image beam 11a is reflected by a mirror 16 and is incident on a mixing dichroic mirror 17. The green and magenta image beams 11a and 14 are mixed with each other by the mixing dichroic mirror 17 to form an RGB composite image beam 18. This image beam 18 is then enlarged/projected on a large screen 20 through a projecting optical system 19, thus reproducing a color image.

In contrast to the above-described mirror scheme, in a prism scheme, four rectangular prisms are bonded to each other, and color mixing films are formed on the bonding surfaces to form a dichroic prism. R, G, and B image beams are mixed by this dichroic prism. That is, the dichroic prism has the same function as that of the mixing dichroic mirrors 13 and 17 in the mirror scheme.

In the liquid crystal color projection apparatus having the above-described arrangement, after the light from the light source is separated into the R, G, and B beams, and the beams are respectively transmitted through the liquid crystal panels 7, 12, and 15, the R, G, and B beams are mixed with each other to be enlarged/projected on the screen 20. Therefore, the respective pixels of the liquid crystal panels 7, 12, and 15 must be completely superposed on each other on the screen 20. For this reason, high precision is required with regard to the mounting positions, especially mounting angles, of the dichroic mirrors 4, 9, 13, and 17, the liquid crystal panels 7, 12, and 15, and the total reflection mirrors 6 and 16.

Under the circumstances, these optical components are generally mounted on an optical base 21 consisting of die-cast aluminum having high rigidity. Precision machining is applied to the respective mounting positions on the optical base 21 to form accurate flat surfaces. For this reason, the manufacturing cost of the optical base 21 is high. In addition, since the optical components are fastened to the optical base 21 with screws, the mounting positions tend to deviate from proper positions because of differences in dimension between screw mounting holes and screws.

Furthermore, in order to superpose the respective pixels of the liquid crystal panels 7, 12, and 15 on the screen 20, the projection apparatus requires an adjusting mechanism capable of moving the respective panels in the X and Y directions, and rotating them on the X-Y plane. A conventional adjusting mechanism, however, has a complicated structure, and hence has a large number of components, requiring much time for assembly and adjustment.

A projection apparatus is arranged such that its optical axis is perpendicular to the screen surface. If, therefore, a conventional liquid crystal projection apparatus is installed on a floor or suspended from a ceiling, and an image is projected while the overall apparatus is inclined toward a screen arranged parallel to a wall surface, trapezoidal distortion or a focusing error occurs in a projected image because of the difference in distances between a projection lens and the upper and lower ends of the screen. However, such trapezoidal distortion or a focusing error cannot be corrected as long as liquid crystal panels are used as image display carriers.

In addition, when such a liquid crystal projection apparatus is to be used for an audio/visual system, it is required that a large screen be obtained with the minimum projection distance. Various attempts have been made to satisfy these requirements. However, any liquid crystal projection apparatus which can satisfy them has not been provided yet.

In the conventional apparatus, pixels of the respective liquid crystal panels are completely superposed on each other on the screen 20 by means of the adjusting mechanism which is mounted on the optical base 21 and is capable of moving the liquid crystal panels 7, 12, and 15 in the X and Y directions and rotating them on the X-Y plane. Even if, however, the mounting positions and angles of the optical components are accurately set, pixel misregistration is caused near the upper or lower end of the projection screen.

The present inventor has studied the relationship between separated three color beams and the mixing dichroic mirrors 13 and 17. As a result, in consideration of the fact that the numbers of times that the separated three color beams are reflected by or transmitted through the dichroic mirrors 13 and 17 are different from each other, the present inventor has found that the three color beams are slightly refracted when they are transmitted through the dichroic mirrors 13 and 17, and this refraction causes pixel misregistration, when a corresponding image is enlarged/projected on the screen 20, because of the differences between the numbers of times that the three color beams are transmitted through the mixing dichroic mirrors exhibiting different refraction characteristics for the respective channels. In the conventional apparatus shown in FIG. 23, the numbers of times that the R, G, and B are reflected/transmitted differ from each other as follows. For the B beam, a reflection count is 0, and a transmission count is 2 (the dichroic mirror mirrors 13 and 17). For the R beam, a reflection count is 0 (the dichroic mirror 13), and a transmission count is 1 (the dichroic mirror 17). For the G beam, a reflection count is 1 (the dichroic mirror 17), and a transmission count is 0. FIG. 24 shows these reflection and transmission counts. Owing to the incident angles of the R, G, and B beams with respect to the mixing dichroic mirrors 13 and 17, refraction causes the optical axes of the B and R beams which are transmitted through the mixing dichroic mirrors 13 and 17 to be shifted parallel to the surface of FIG. 23. This will be further described below with reference to FIGS. 25 and 26.

FIG. 25 shows a refraction state in which a parallel beam 22 is transmitted through a liquid crystal panel 23 and is incident on a dichroic mirror 24. An upper edge 22a and a lower edge 22b of the parallel beam 22 are incident on the dichroic mirror 24 at an incident angle $\theta$, and hence are refracted at the same angle. The transmitted beam becomes a parallel beam translated from the incident beam by a distance corresponding to the refraction. As a result, the position of the liquid crystal panel 23, viewed from a projection lens 25 side, is offset to a position 23a, as indicated by a dotted line in FIG. 25. However, since offset amounts $d_1$ and $d_2$ are equal to each other, a size $\underline{v}$ of the liquid crystal panel 23 is equal to a size $v_2$ of the offset liquid crystal panel 23a. In this case, therefore, pixel misregistration can be corrected by adjusting the position of the liquid crystal panel 23 by the distance corresponding to the translation of the liquid crystal panel 23.

As shown in FIG. 26, however, in the liquid crystal color projection apparatus, a condenser lens 26 is arranged in front of the liquid crystal panel 23 to focus the incident beam 22 as the parallel beam toward the projection lens 25. For this reason, upper and lower edges 27a and 27b of a focused beam 27 transmitted through the liquid crystal panel 23 are incident on the dichroic mirror 24 at different incident angles $\theta_1$ and $\theta_2$, and hence are refracted at different angles Therefore, the position of the liquid crystal panel 23, viewed from the projection lens 25 side, is offset to a position 23b, as indicated by a dotted line in FIG. 26. Owing to the different incident angles $\theta_1$ and $\theta_2$, the upper and lower edges of the transmitted beam exhibit different offset amounts with respect to the incident focused beam. In this state, the liquid crystal panel 23 is seen as if it is vertically elongated. That is, since $\theta_1 > \theta_2$ (incident angles), then $d_1 > d_2$ (offset amounts of the focused beam 27 and the transmitted light), and the apparent size of the liquid crystal panel 23 is elongated as indicated by $v_1$ and $v_2$.

Referring to FIG. 26, since the inclination of the dichroic mirror 24 in a direction perpendicular to the surface of the drawing is zero, refraction in this direction is negligibly small as compared with refraction in the vertical direction.

It is found that refraction amounts of the R, G, and B beams slightly differ from each other, i.e., the optical axes of the R, G, and B beams are deviated from each other, with different transmission counts. If this state is enlarged by the lens 19, corresponding pixels are shifted from each other, on the screen 20, by an amount corresponding to 0.5 to 1 pixel. Note that reflection counts are not associated with the deviation of optical axes and hence can be neglected.

The transmission type liquid crystal panel 7 (similar to the liquid crystal panels 12 and 15) shown in FIG. 23 includes two polarizing plates (not shown) arranged on both surfaces thereof. This is because a liquid crystal (twisted nematic liquid crystal) used for the liquid crystal panel 7 serves to rotate the plane of polarization of incident light in accordance with the application state of a voltage instead of transmitting or shielding the light. More specifically, if natural light whose polarization direction is not constant is incident on the liquid crystal panel 7, natural light is output regardless of the application state of a voltage. Therefore, even if an image is formed on the liquid crystal panel, the image cannot be recognized. For this reason, the first polarizing plate is arranged in front of the liquid crystal panel 7 to transmit only a light component, of the natural light, which is polarized in a predetermined direction, thus converting the natural light into a linearly polarized beam. That is, when the natural light is transmitted through the first polarizing plate, the natural light is separated into two linearly polarized beams perpendicular to each other. Of these beams, the beam parallel to the polarization direction is transmitted, and the beam perpendicular thereto is absorbed. When the linearly polarized beam parallel to the polarization direction is incident on the liquid crystal panel 7, the polarization direction is partially rotated in accordance with an image, and the beam emerges from the liquid crystal panel 7. When only light component, of the beam from the liquid crystal panel 7, which is polarized in a predetermined direction is transmitted through the second polarizing plate, a halftone image can be obtained. Note that the light component perpendicular to the polarization direction is absorbed by the first polarizing plate to be converted into heat.

In the conventional apparatus, therefore, since at least half of natural light is absorbed by the first polarizing plate in the process of extracting a linearly polarized beam from the natural light by using the first polarizing plate, a problem is posed in terms of effective utilization of light. In addition, since the absorbed light is converted into heat to raise the temperature of the first polarizing plate, the first polarizing plate deteriorates. Therefore, demands have arisen for the development of an apparatus which can convert all light from a light source into light polarized in a predetermined direction, and can solve the problems associated with an increase in light amount and deterioration of a polarizing plate due to heat.

Note that the problem of deterioration of the second polarizing plate is not so serious as that of the first polarizing plate because the opening portion of the liquid crystal panel 7 corresponds to about 40% of its total area (an increase in numerical aperture is an important factor for an increase in luminance of a liquid crystal color projection type display).

As a liquid crystal panel used for the liquid crystal panel projection apparatus having the above-described arrangement, a panel having a pixel arrangement of 240 (V) vertical scanning lines ×400 (H) horizontal pixels reaches a practical level in terms of yield and numerical aperture (brightness). The standard TV signal scheme employs interlaced scanning, in which one frame constituting one image is divided into odd and even fields, and each field is transmitted every 1/60 seconds. Therefore, as a pixel arrangement for a liquid crystal panel, either a non-interlace arrangement based on 240 (V) effective scanning lines or an interlace arrangement based on 480 (V) scanning lines is selected (an intermediate value cannot be selected). If the arrangement of 480 (V) lines is selected, the number of pixels is increased twice from 240. This greatly increases the manufacturing cost of a liquid crystal panel.

A great deal of effort has recently been made to increase the number of pixels of a liquid crystal panel. However, as the number of pixels is increased, a decrease in yield due to pixel defects becomes conspicuous, resulting in an increase in manufacturing cost. In addition, as the numerical aperture is decreased, the luminance of the liquid crystal panel is greatly decreased. That is, a liquid crystal panel having a pixel arrangement of more than 240 (V) lines ×400 (H) pixels has not reached a practical level yet. More efforts and much time will be required to put such a liquid crystal panel into practical use.

SUMMARY OF THE INVENTION

It is an object of the present invention to provide a liquid crystal color projection apparatus which can improve the quality of an image projected on a large screen.

It is another object of the present invention to provide a liquid crystal color projection apparatus which allows optical components to be accurately mounted without using an expensive optical base consisting of a die-cast aluminum.

It is still another object of the present invention to provide a liquid crystal color projection apparatus which can simplify the structure of an adjusting mechanism for a liquid crystal panel, can decrease the number of components, and allows assembly and adjustment to be performed within a short period of time.

It is still another object of the present invention to provide a liquid crystal color projection apparatus which can eliminate trapezoidal distortion or a focusing error in an image projected on a screen.

It is still another object of the present invention to provide a liquid crystal color projection apparatus which can obtain a large image at a short projection distance.

It is still another object of the present invention to provide a liquid crystal color projection apparatus which can prevent pixel misregistration due to differences between numbers of times that beams are transmitted through a beam mixing means.

It is still another object of the present invention to provide a liquid crystal color projection apparatus which can eliminate the loss of light from a light source to increase the amount of light.

It is still another object of the present invention to provide a liquid crystal color projection apparatus which can directly extract a polarized light component from a light source beam without using a polarizing plate, thereby solving the problem of deterioration of a polarizing plate due to heat.

It is still another object of the present invention to provide a liquid crystal color projection apparatus which can increase the apparent number of pixels and can maintain the screen luminance by using a low-cost liquid crystal panel at a practical level.

In order to achieve the above objects, according to the present invention, there is provided a liquid crystal color projection apparatus comprising a light source, dichroic mirrors for separating light, supplied from the light source, into red, green, and blue beams, transmission type liquid crystal panels, respectively arranged on optical paths of the three color beams separated by the dichroic mirrors, for forming images corresponding to the three color beams, beam mixing means for mixing image beams from the transmission liquid crystal panels to reproduce a color image, at least two parallel side plates having plural pairs of engaging portions, arranged at symmetrical positions, for fixing the dichroic mirrors and the liquid crystal panels at predetermined positions, and bar members, each having two end portions fixed to one pair of engaging portions of the side plates, for fixing and holding two arbitrary end portions of each of the dichroic mirrors and the liquid crystal panels thereon.

BRIEF DESCRIPTION OF THE DRAWINGS

FIG. 3 is a perspective view showing the mounting structure of a liquid crystal panel;

FIG. 4 is a plan view of the liquid crystal;

FIG. 24 is a view showing reflection and transmission counts of R, G, and B beams in the conventional apparatus;

FIG. 25 is a view showing a refraction state of a parallel beam incident on a dichroic mirror; and FIG. 26 is a view showing a refraction state of a focused beam incident on the dichroic mirror.

DESCRIPTION OF THE PREFERRED EMBODIMENTS

The present invention will be described in detail below with reference to the preferred embodiments shown in the accompanying drawings.

Figure 1:
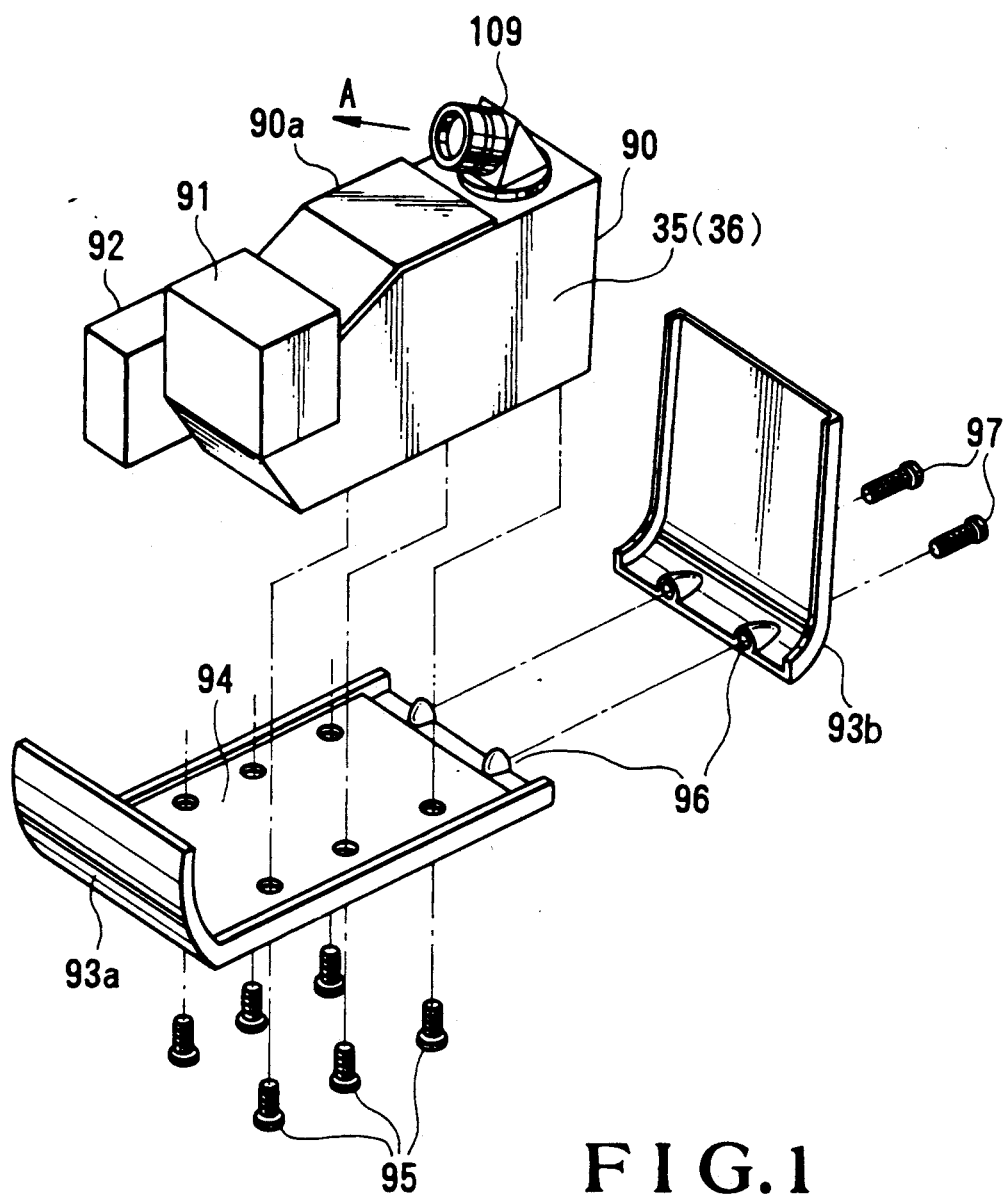
FIG. 1 is a perspective view showing a main part of a liquid crystal color projection apparatus according to an embodiment of the present invention.
Figure 2:
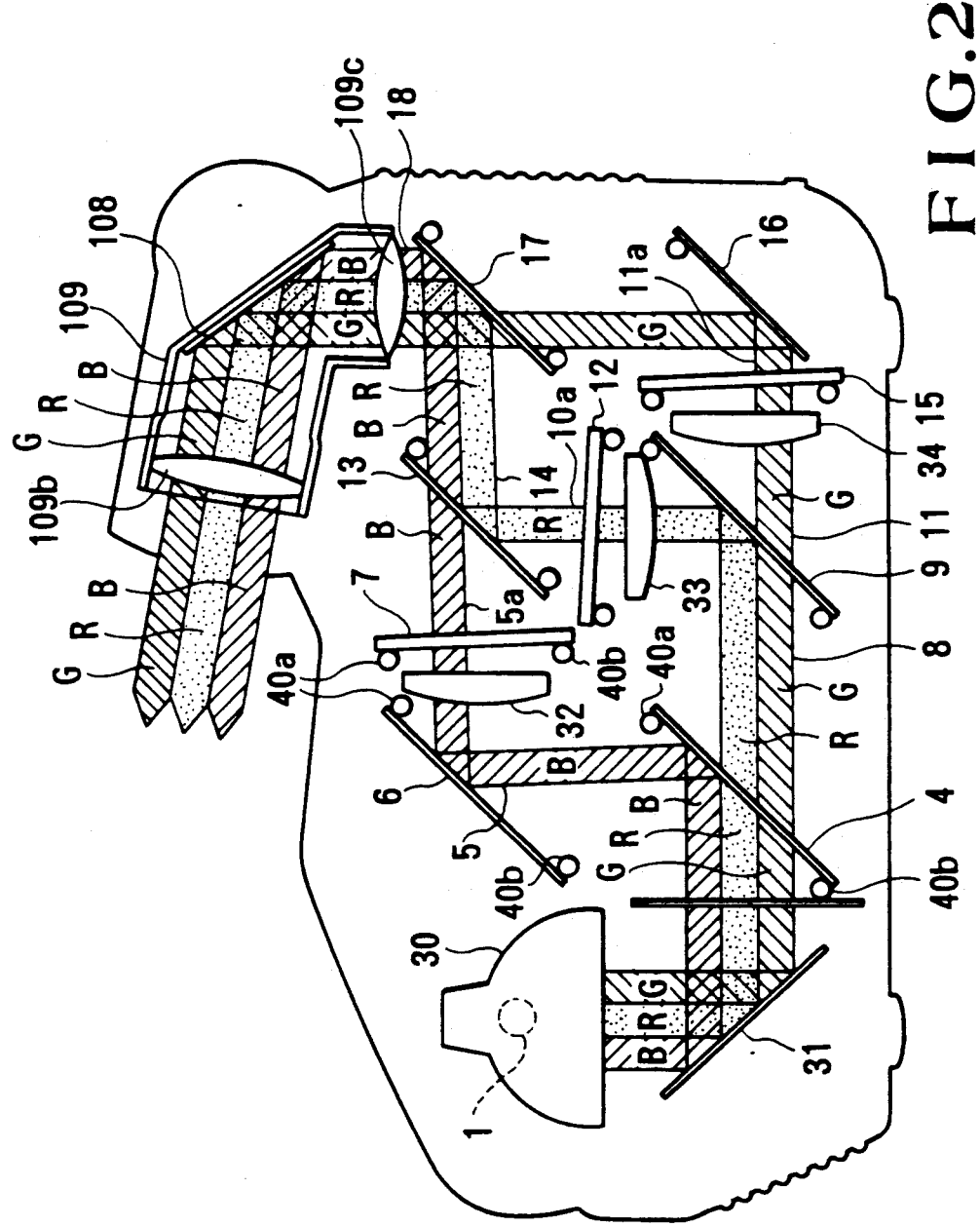
FIG. 2 is a view showing the arrangement of the liquid crystal color projection apparatus in FIG. 1.
Figure 23:
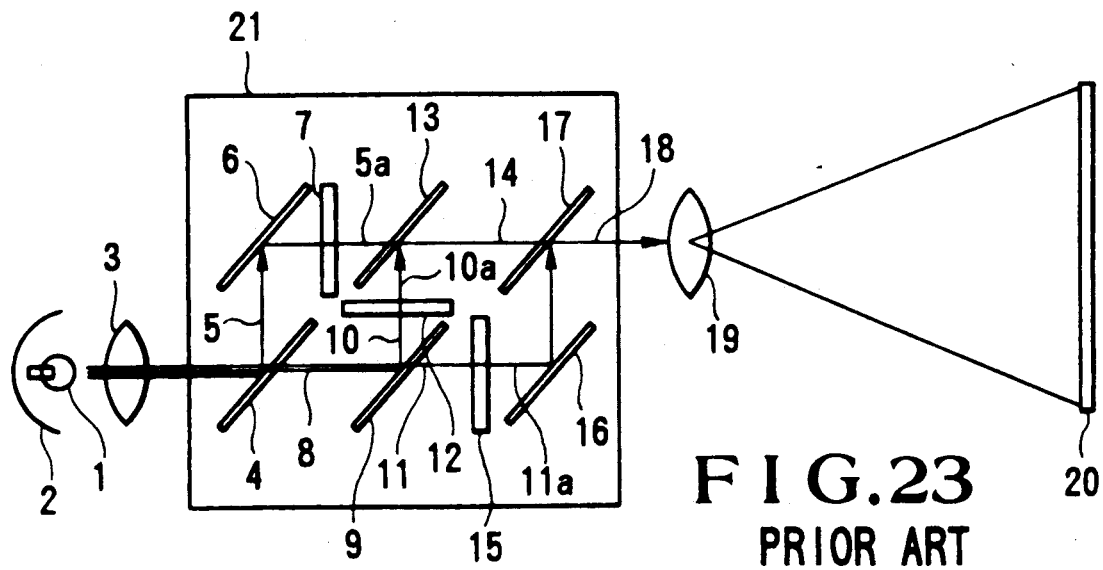
FIG. 23 is a view showing the arrangement of a conventional liquid crystal color projection apparatus.

FIGS. 1 to 4 show a liquid crystal color projection apparatus according to an embodiment of the present invention. FIG. 1 shows a main part of the liquid crystal color projection apparatus. FIG. 2 shows the arrangement of the liquid crystal color projection apparatus. FIG. 3 shows the mounting structure of a liquid crystal panel. FIG. 4 is a plan view of the panel. Note that the same reference numerals in FIGS. 1 to 4 denote the same parts as in FIG. 23, and a description thereof will be omitted, and that a focusing lens is omitted from FIG. 3.

Referring to FIG. 1, reference numeral 90 denotes an optical unit including a pair of parallel side plates 35 and 36 accurately positioned by a top plate 90a and a bottom plate (not shown), a liquid crystal panel and a mirror (both of which will be described later) held by the side plates 35 and 36, and a projection lens 109 for projecting image light in a direction indicated by an arrow A; 91, a light source unit; 92, a power source unit; 93a and 93b, divided low housings; and 94, a base plate for fixing the optical unit 90. After the optical unit 90 is fixed to the base plate 94 with screws 95, engaging portions of the lower housings 93a and 93b are engaged with each other and are fixed to each other with screws 97.

Note that the side plates 35 and 36 may be integrally formed with the top plate 90a or the bottom plate to have a U-shaped cross section so as to improve the precision of the dimensions between the side plates 35 and 36. Alternatively, the side plates 35 and 36 may be integrally formed with other members such as the base plate 94.

Referring to FIGS. 2 to 4, reference numeral 30 denotes a reflecting mirror, having a reflecting surface constituted by a parabolic surface, for causing light from a light source 1 to become a beam parallel to the optical axis; 31, a mirror for totally reflecting the parallel beam to guide it to a dichroic mirror 4; and 32, 33, and 34, focusing lenses integrally formed with liquid crystal panels 7, 12, and 15, respectively. The following optical components are arranged between the pair of side plates 35 and 36, which are accurately positioned to oppose each other: the dichroic mirror 4, dichroic mirrors 9, 13, and 17, the liquid crystal panels 7, 12, and 15 with the focusing lenses, and total reflection mirrors 6 and 16. Plural pairs of holes 38a, 38b..., and 39a, 39b... as engaging portions are respectively formed in the side plates 35 and 36. In addition, round bar members 40a and 40b are respectively fitted and fixed in these holes, thus maintaining the parallelism between the side plates 35 and 36. As shown in FIGS. 3 and 4, the side end portions of the front surface of each of the liquid crystal panels 7, 12, and 15 in one direction (Y direction) perpendicular to the bar members 40a and 40b are in tight contact with the bar members 40a and 40b. In addition, each of the liquid crystal panels 7, 12, and 15 is fixed by a pair of fastening metal plates 42 and 43 fastened on a panel frame 41. Press portions 44, curved in the form of a semicircular arch, are integrally formed on two end portions of the inner edge of each of the fastening plates 42 and 43. The press portions 44 are respectively engaged with the bar members 40a and 40b to press each liquid crystal panel against the bar members 40a and 40b.

In this case, since the front surface of the liquid crystal panel 7 is in tight contact with the bar members 40a and 40b, the liquid crystal panel 7 is kept parallel with the bar members 40a and 40b, and hence its mounting angle does not change. Since the liquid crystal panel 7 is in a linear contact with the bar members 44, the panel 7 can easily and accurately set at a proper angle in position adjustment, and no backlash occurs.

The holes 38a, 38b, 39a, 39b, ... are respectively formed in the side plates 35 and 36 such that the bar members 40a and 40b are engaged with the holes to be fixed. However, bosses may be formed on the side plate 35 and 36 so as to be engaged with axial holes in the bar members 40a and 40b, or a combination of these structures may be employed.

As the fastening metal plates 42 and 43, any members can be used as long as they have structures causing the front surface of each liquid crystal panel to be in tight contact with the bar members 40a and 40b. For example, a structure similar to a clip for clamping a liquid crystal panel and a bar member may be employed. In addition, the pair of fastening metal plates 42 and 43 may have different shapes.

Note that, the both end portions of the incident surface of each of the dichroic mirrors 6, 19, 13, and 17 and the total reflection mirrors 6 and 16, similar to the liquid crystal panels 7, 12, and 15, are respectively fixed to the pair of bar members 40a and 40b in tight contact therewith. Reference numeral 109 denotes an L-shaped projection lens having a front lens 109b, a rear lens 109c, and a projection mirror 108.

In this arrangement, since the respective optical components are in tight contact with and fixed to each pair of bar members 40a and 40b horizontally arranged between the side plates 35 and 36, the mounting precision of the bar members 40a and 40b, i.e., the position precision of the holes 38a, 38b, 39a, 39b,..., corresponds to the mounting precision of the respective optical components. If, therefore, the side plates 35 and 36 are parallel to the optical axis, and the mounting angles of the bar members 40a and 40b with respect to the side plates 35 and 36 are constant, the mounting angles of all the optical components can be set to be constant. In addition, since the apparatus having such an arrangement requires no expensive optical base consisting of die-cast aluminum, the manufacture thereof can be simplified and facilitated.

Figure 5A:
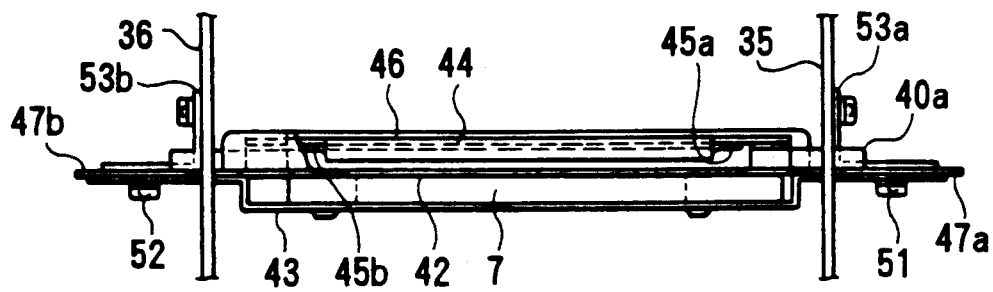
FIG. 5a is a plan view showing an adjusting/holding mechanism for the liquid crystal panel.
Figure 5B:
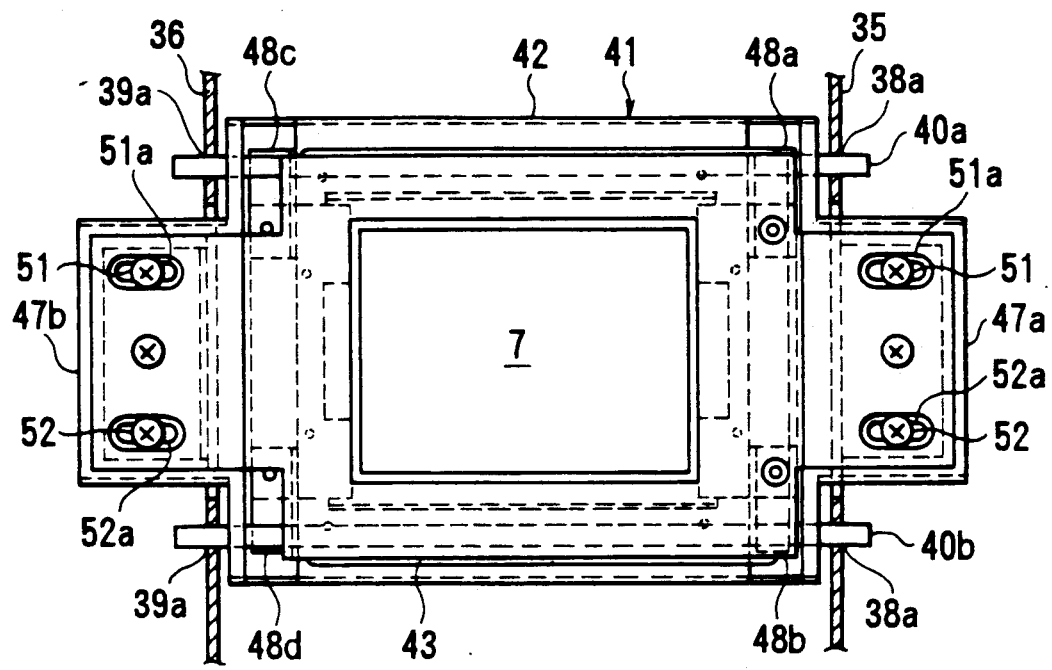
FIG. 5b is a front view of the adjusting/holding mechanism.
Figure 5C:
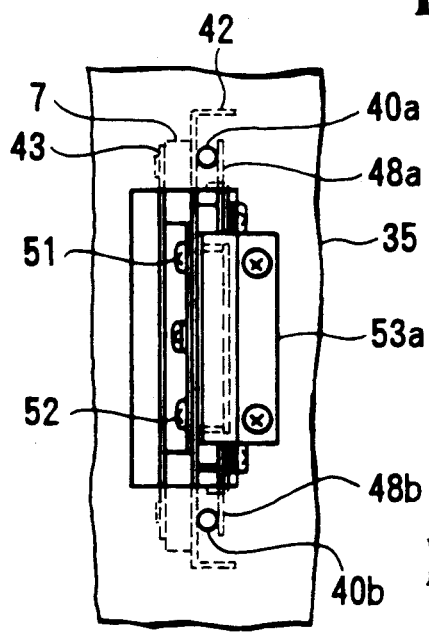
FIG. 5c is a right side view of the adjusting/holding mechanism.
Figure 6:
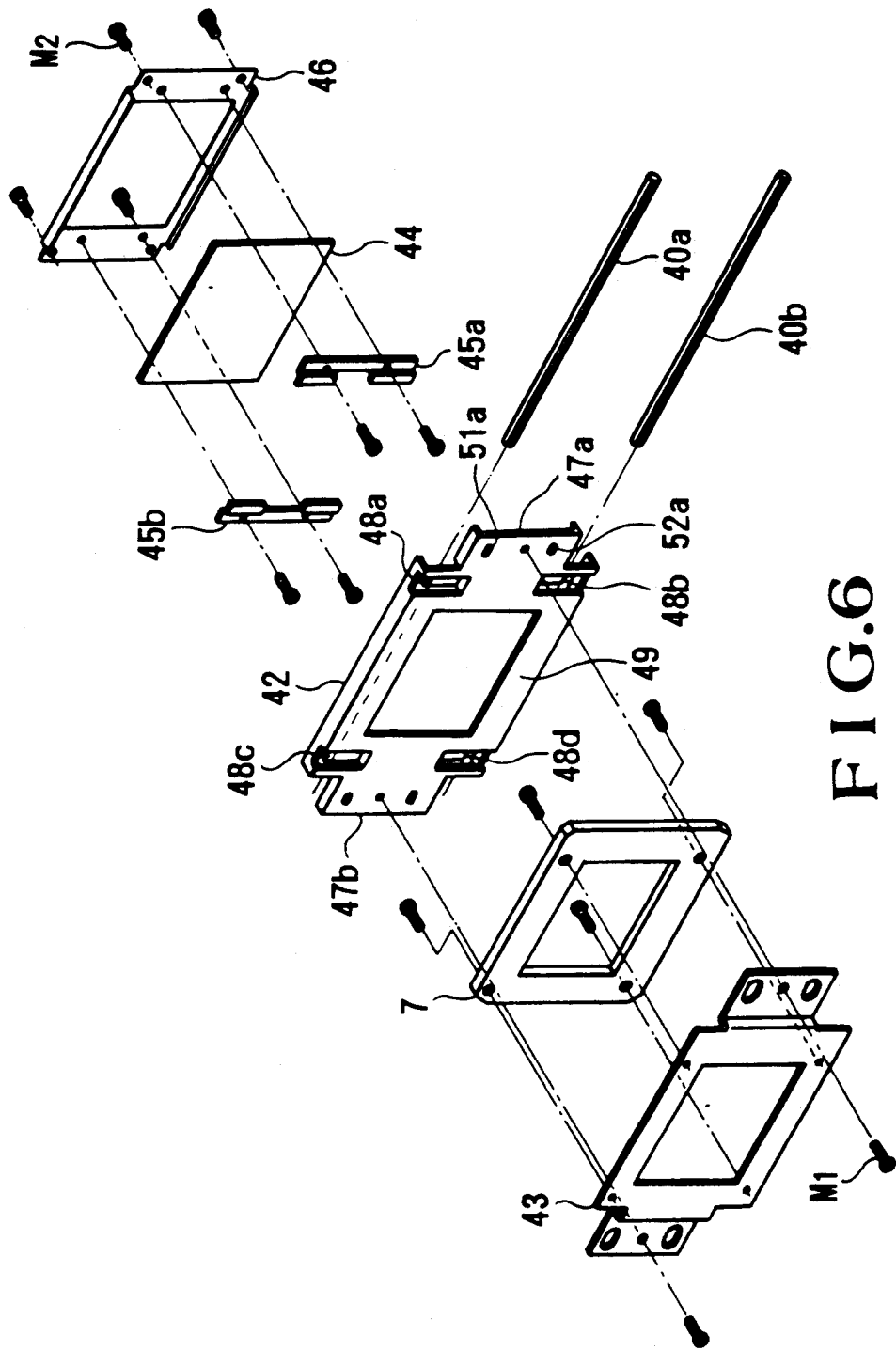
FIG. 6 is an exploded perspective view of the adjusting/holding mechanism.
Figure 7:
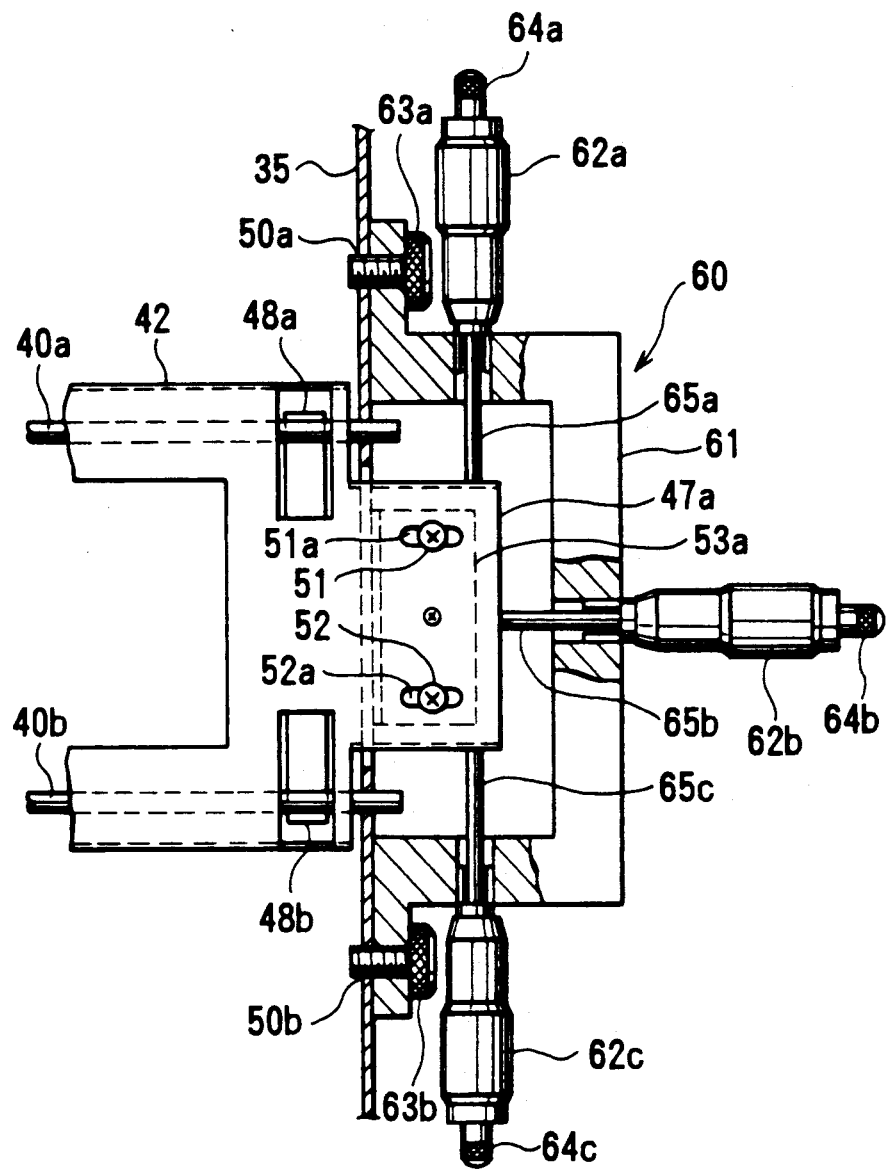
FIG. 7 is a plan view for explaining the adjustment method of the adjusting/holding mechanism.

FIGS. 5a to 7 show a case wherein a position adjusting mechanism is added to the liquid crystal panel in FIG. 3. FIG. 5a shows an adjusting/holding mechanism of a liquid crystal panel. FIG. 5b is a front view of the mechanism. FIG. 5c is a right side view of the mechanism. FIG. 6 is an exploded perspective view of the mechanism. FIG. 7 is a plan view for explaining the adjusting method of the adjusting/holding mechanism.

Referring to FIGS. 5a to 6, the incident surface of each of the liquid crystal panels 7, 12, and 15 is fixed to bar members 40a and 40b in tight contact therewith so as to be moved/adjusted in the Y and X directions by the adjusting/holding mechanism 41.

The adjusting/holding mechanism 41 includes a holding member 42 and a cover 43 which clamp the liquid crystal panel 7 (12, 15). The holding member 42 has a frame-like shape with a blanked portion corresponding to the effective surface of the liquid crystal panel 7. Similarly, the cover 43 has a frame-like shape with a blanked portion corresponding to the effective surface of the liquid crystal panel 7. The cover 43 is fixed to the holding member 42 with set screws $M_1$. A pair of press members 45a and 45b for holding the both end portions of a polarizing plate 44 and a polarizing plate holding member 46 are fixed to the opposite surface of the holding member 42 to the liquid crystal panel 7 with set screws $M_2$. The polarizing plate 46 has a frame-like shape with a blanked portion corresponding to the effective surface of the liquid crystal panel 7. Edge portions 47a and 47b respectively having elongated holes 51a and 51b extend from the left and right sides of the holding member 42, i.e., the two sides thereof on the sides of the side plates 35 and 36, so as to be parallel with the axis of the bar members 40a and 40b. In addition, portions near both end portions of each of the upper and lower sides, of the holding member 42, which are parallel with the bar members 40a and 40b, are blanked to form tongue pieces 48a to 48d. These tongue pieces 48a to 48d are bent toward the polarizing plate 44 at substantially right angles and are further bent at substantially right angles to be parallel to a main body 49 of the holding member 42. As a result, gaps are formed between the tongue pieces 48a to 48d and the main body 49 so as to insert the bar members 40a and 40b therein. With this arrangement, the holding member 42 is fixed to the pair of bar members 40a and 40b to be movable and adjustable in the vertical and horizontal directions. Note that the polarizing plate 44 held by the pair of press members 45a and 45b and the polarizing holding member 46 is fixed to the tongue pieces 48a to 48d with screws to ensure a proper gap with respect to the liquid crystal panel 7. Therefore, even if the polarizing plate 44 absorbs polarized light and generates heat, the liquid crystal panel 7 is not thermally influenced.

Note that the shapes and extending directions of the edge portions 47a and 47b can be arbitrarily set as long as they are integrally formed with the holding member 42.

The adjusting/holding mechanism 41 having such an arrangement is locked by the pair of bar members 40a and 40b to be moved and adjusted in the X and Y directions. This adjustment includes rotation of the adjusting/holding mechanism 41 as needed. In this case, since the incident surface of the liquid crystal panel 7 is in tight contact with the bar members 40a and 40b through the main body 49, the liquid crystal panel 7 is kept parallel with the bar members 40a and 40b and its mounting angle is not changed.

Note that an adjustment angle and an adjustment distance in such adjustment are very small (1 mm or less).

FIG. 7 shows a case wherein the position adjustment of the adjusting/holding mechanism 41 is performed with high precision.

As described above, after the adjusting/holding mechanism 41 is attached to the bar members 40a and 40b, a position adjusting jig 60 is attached to the side plates 35 and 36. Since identical arrangements are formed on the sides of the side plates 35 and 36, only the arrangement on the side of the side plate 35 is shown in FIG. 7 and will be described below for the sake of descriptive convenience. Pressing units 62a to 62c are respectively attached to the sides of a substantially U-shaped frame member 61 of the position adjusting jig 60. The position adjusting jig 60 is fixed to the side plate 35 with set screws 63a and 63b respectively tightened into a pair of screw holes 50a and 50b formed in the side plate 35 in advance. For example, micrometers are used as the pressing units 62a to 62c. When knobs 64a to 64c of the pressing units 62a to 62c are rotated, spindles 65a to 65c are reciprocated. Therefore, if the edge portion 47a is fixed to a bracket 53a with set screws 51 and 52 after accurate position adjustment is performed by pressing the edge portion 47a of the holding member 42 attached to the bar member 40a and 40b from three directions by means of the spindles 65a to 65c, the liquid crystal panel 7 is positioned/fixed to a desired position together with the holding member 42.

In this case, since the liquid crystal panel 7 is only translated with respect to the bar members 40a and 40b, no change in mounting angle occurs.

Note that the dichroic mirrors 6, 9, 13, and 17 and the total reflection mirrors 6 and 16 need not be accurately adjusted for pixel registration, unlike the liquid crystal panels 7, 12, 15. For this reason, the both end portions of the incident surface of each of these mirrors are simply fixed to the pair of bar members 40a and 40b with set fastening metal members (not shown).

In the adjusting/holding mechanism having such an arrangement and used for liquid crystal panels, since the liquid crystal panels 7, 12, and 15 are in tight contact with and fixed to the pair of bar members 40a and 40b horizontally bridged between the side plates 35 and 36 by means of the adjusting/holding mechanism 41, the mounting angle of each of the bar members 40a and 40b, i.e., the position precision of the holes 38a, 38b, 39a, and 39, ..., is the mounting precision of each of the liquid crystal panels 7, 12, and 15. Therefore, if the side plates 35 and 36 are parallel with the optical axis and the mounting angles of the bar members 40a and 40b with respect to the side plates 35 and 36 are constant, the mounting angles of all the liquid crystal panels 7, 12, and 15 can be made constant. In addition, the apparatus having such an arrangement requires no expensive optical base consisting of die-cast aluminum, the manufacture thereof can be simplified and facilitated Furthermore, since the micrometers 62a to 63c are used as adjusting means for moving/adjusting the liquid crystal panels 7, 12, and 15 in the Y and X directions, the arrangement of the apparatus can be considerably simplified, and the number of components can be decreased. With this arrangement, the liquid crystal panels 7, 12, and 15 can be easily moved/adjusted.

Figures 8, 9:
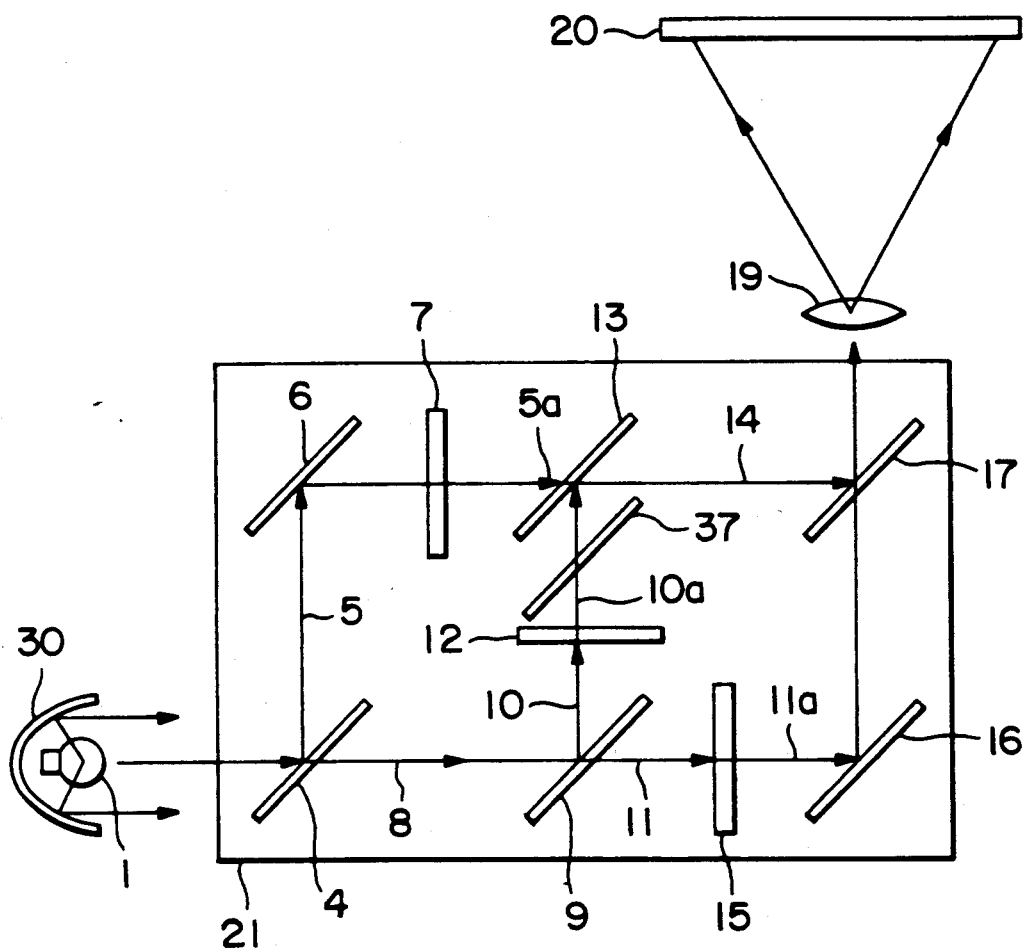
FIG. 8 is a view showing the arrangement of a liquid crystal color projection apparatus according to another embodiment of the present invention.
FIG. 9 is a view showing reflection and transmission counts of R, G, and B beams.

FIG. 8 shows a liquid crystal color projection apparatus according to another embodiment of the present invention. The same reference numerals in FIG. 8 denote the same parts as in FIG. 2, and a description thereof will be omitted. The embodiment shown in FIG. 8 is different from the embodiment shown in FIG. 2 in that a mixing dichroic mirror 17 for reflecting a magenta image beam 14 and transmitting a green image beam 11a is arranged in an optical path between a projecting optical system 19, a mirror 6, and a mixing dichroic mirror 13, and a parallax correcting plate 37 is arranged in at least one optical path between at least one liquid crystal panel 12 and the mixing dichroic mirror 13, while the projecting optical system 19 and a screen 20 are arranged above the mixing dichroic mirror 17. The parallax correcting plate 37 is constituted by a transparent glass plate consisting of the same material for the dichroic mirrors 13 and 17 and having the same thickness as that thereof. The parallax correcting plate 37 is arranged at the same angle as that of the dichroic mirrors 13 and 17 to be inclined at 45° with respect to a red image beam 10a.

In the liquid crystal color projection apparatus having such a mixing/projecting optical system, the number of times that R, G, and B beams are transmitted through the mixing dichroic mirrors 13 and 17 can be set to be one or less, as shown in FIG. 9. In addition, since the parallax correcting plate 37 is arranged in the optical path where the number of times that the red image beam 10a is transmitted is zero without the parallax correcting plate 37 the number of times that the red image beam 10a is transmitted can be set to be one, similar to the G and B beams, as shown in FIG. 10.

Therefore, the refraction amount of the R beam, which is different from the refraction amount of each of the G and B beams because of the difference in transmission count, can be corrected to be equal to that of each of the G and B beams. As a result, the optical axes of all the separated three color beams can be completely matched with each other, and hence the respective pixels of the liquid crystal panels 7, 12, and 15 can be completely superposed on each other on the screen 20, thus preventing pixel misregistration.

Figures 10, 11:
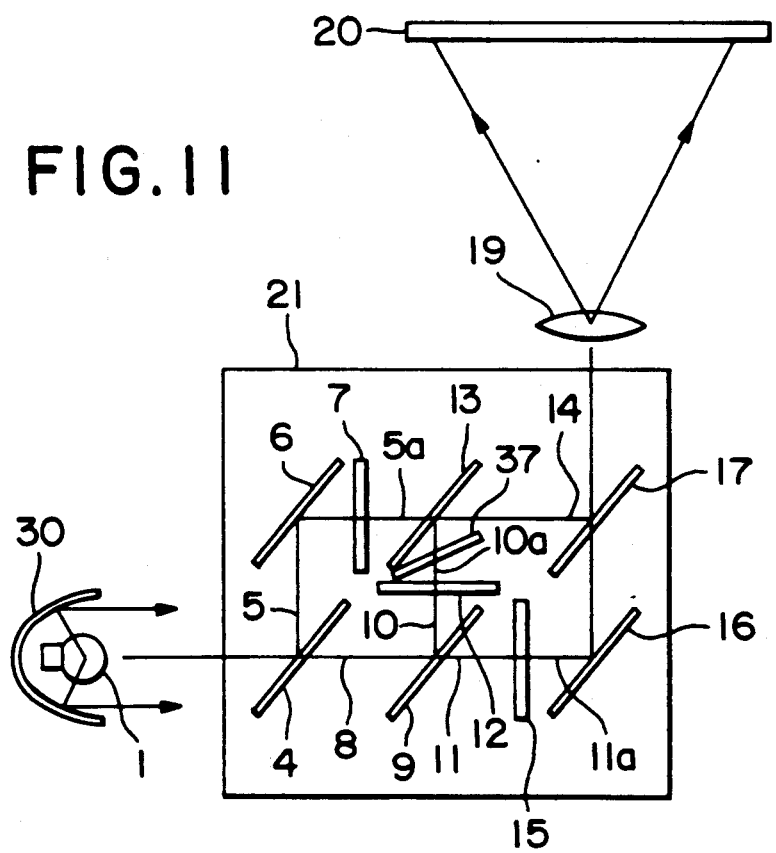
FIG. 10 is a view showing reflection and transmission counts of the R, G, and G beams upon correction processing.
FIG. 11 is a view showing the arrangement of a modification of the apparatus in FIG. 8.

FIG. 11 shows a modification of the embodiment shown in FIG. 8. In this modification, in order to reduce the size of the apparatus, a parallax correcting plate 37 is arranged at an angle smaller than that of the mixing dichroic mirror mirrors 13 and 31.

In general, the size of such a liquid crystal color projection apparatus is minimized. For this reason, it is difficult to arrange the parallax correcting plate 37 between a liquid crystal panel 10 and the mixing dichroic mirror 13 at the same angle as that of the mixing dichroic mirrors 13 and 17 which are normally arranged at an angle of 45°, without interfering with other optical paths. If such an arrangement is employed, the size of an optical base is increased, resulting in an increase in size of the apparatus itself, as shown in FIG. 8.

As in this embodiment, therefore, if the parallax correcting plate 37 is arranged at an angle smaller than that of the dichroic mirrors 13 and 17 so as not to interfere with the optical path of the magenta image beam 14, and the thickness of the parallax correcting plate 37 is selected to obtain the same refraction amount as that obtained by the dichroic mirrors 13 and 17, the same effect as that of the above-described embodiment can be obtained, and at the same time, the size of the apparatus can be reduced.

In this case, since the refraction amount of the parallax correcting plate 37 is reduced with an increase in crossing angle with respect to the red image beam 10a, the thickness of the parallax correcting plate 37 is set to be larger than that of the dichroic mirrors 13 and 17.

The same effect can also be obtained even if the parallax correcting plate 37 is composed of a material having the same thickness as that of the dichroic mirrors 13 and 17 but having a larger refractive index than them.

As described above, the liquid crystal projection apparatus of the present invention can perfectly match the optical axes of the three color beams, i.e., the R, G, and B beams, with each other to prevent pixel misregistration on the screen.

Figure 12:
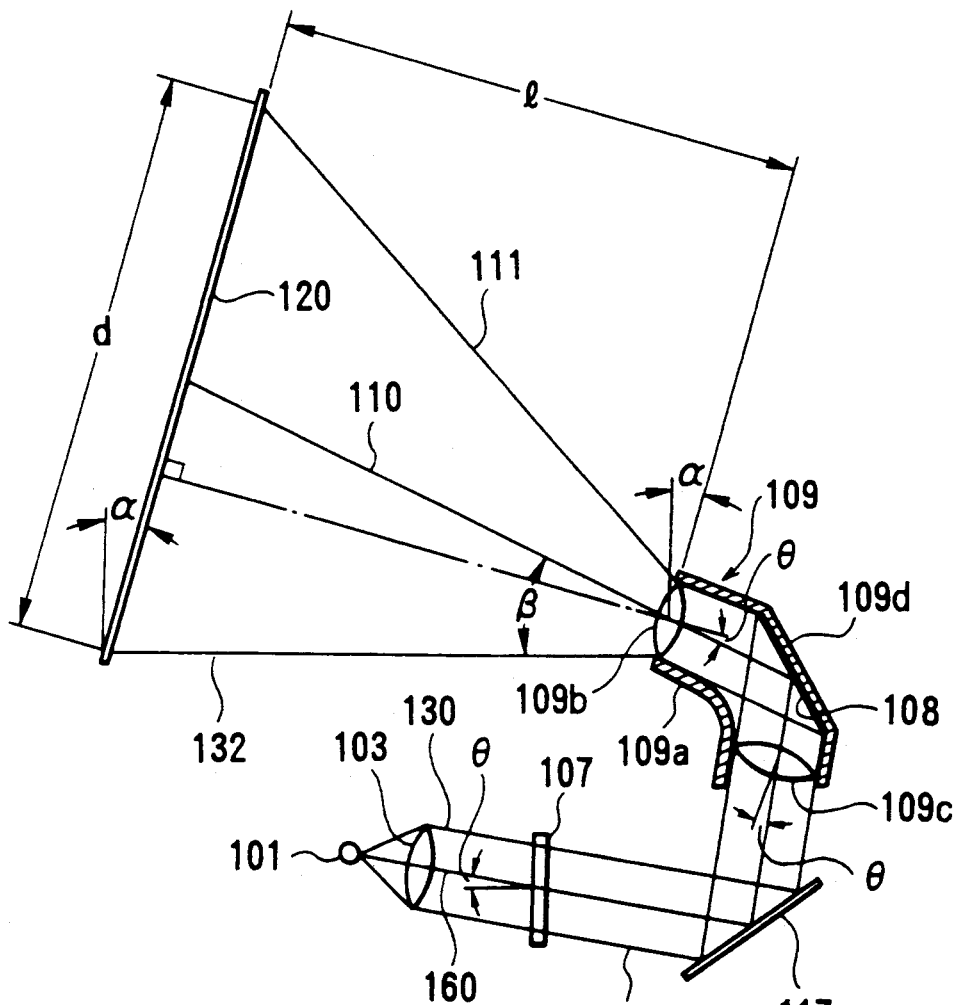
FIG. 12 is a view showing the arrangement of a liquid crystal color projection apparatus according to another embodiment of the present invention.

FIG. 12 shows a liquid crystal projection apparatus according to still another embodiment of the present invention. More specifically, FIG. 12 shows a projection path portion of a liquid crystal projection apparatus designed to be installed on a floor. FIG. 12 shows only one liquid crystal panel for the sake of descriptive convenience.

The liquid crystal projection apparatus of this embodiment comprises a condenser lens 103 for substantially collimating light radiated from a light source 101, e.g., a xenon lamp, a transmission type liquid crystal panel 107 for transmitting a substantially parallel light source beam 130 obtained by the condenser lens 103 to form image light 140, a first mirror 117 for reflecting the image light 140 transmitted through the liquid crystal panel 107 upward at an angle perpendicular to an optical axis 160 (incidence optical axis) of the image light 140, a second mirror 108 for receiving the reflected image beam and reflecting it backward at an angle of $90° + \alpha$ with respect to the optical axis of the reflected image beam, and a projection lens 109 for projecting the image light, reflected by the second mirror, onto a screen 120.

The transmission type liquid crystal panel 107, the projection lens 109, and the screen 120 are arranged such that their centers coincide with the incidence optical axis of the light source 101 and the projection optical axis 110 formed by inclining the incidence optical axis 160 upward by means of the mirror 108. The light source 101 and the condenser lens 103 are arranged such that incidence optical axis 160 is inclined at a predetermined inclination $\theta$ (to be described in detail later) with respect to a horizontal line passing through the light source 101 and is incident on the liquid crystal panel 107.

Figure 13:
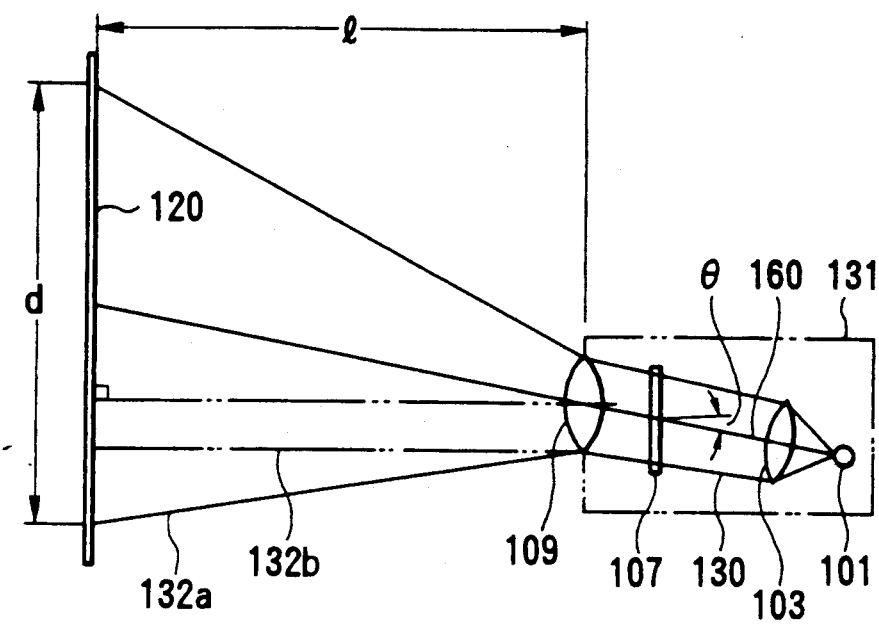
FIG. 13 is a view showing the principle of projection performed by a liquid crystal projection apparatus.

A liquid crystal projection apparatus 131 is generally installed on the floor in a room or suspended from the ceiling. In practice, therefore, the base line or upper line of a projected image is preferably located at a position parallel to the liquid crystal projection apparatus 131. For this reason, as shown in FIG. 13 which shows the principle of projection of the liquid crystal projection apparatus, the liquid crystal panel 107 and the screen 120 may be arranged to be parallel with each other, and the inclination $\theta$ (indicated by an angle of elevation in FIG. 13) of the incidence optical axis 160 may be set to be large to project the base line of a projected image at a horizontal position, as indicated by an alternate long and two short dashed line 32b. If, however, the optical axis 160 is inclined at a large angle in this manner, luminance variations occur because the amounts of light at the respective portions in the projected image differ from each other. For this reason, the inclination $\theta$ of the incidence optical axis 160 in the present invention is set within the range defined by the following expression:

$$0 < |\theta| < < |\tan\theta| \quad (1)$$

where $\tan\theta = d/2\mu$, d is the maximum angle of view, and $\mu$ is the projection distance. The inclination $\theta$ is preferably set to be 2 to 4 degrees. With this setting, the base line of the projected image is lowered below the projection lens 109, as indicated by a solid line 32a, to reduce the differences in light amount between the respective portions in the projected image, thereby suppressing luminance variations.

The embodiment shown in FIG. 12 will be further described below on the basis of the description given above with reference to FIG. 13. As described above, the light source beam 130 is inclined and incident on the liquid crystal panel 107 to obtain the image beam 140 to which image information is added b the liquid crystal panel 107. Thereafter, the image beam 140 is totally reflected upward at a right angle within the same incidence plane by the first mirror 117 and is incident on the projection lens 109. The projection lens 109 is constituted by an L-shaped mirror barrel 109a and front and rear lenses 109b and 109c respectively inserted in the two opening ends of the mirror barrel 109a. The second mirror 108 is arranged on the inner surface of a bent portion 109d of the mirror barrel 109a. The rear lens 109c is inclined in the same direction as that of the liquid crystal panel 107 at the same inclination as that thereof with respect to the optical axis 160 of the image beam 140 reflected by the first mirror 117. The image beam 140 transmitted through the rear lens 9c is totally reflected by the second mirror 8 at an angle $\beta$ obtained by adding an angle $\alpha$ to the inclination $\theta$ of the light source beam 30 so as to locate the base line of a projected image at a position parallel with the front lens 109b of the projection lens 109. An image is then projected on the screen 120 through the front lens 109b arranged parallel with the liquid crystal panel 107.

The liquid crystal panel 107 is constituted by liquid crystal cells of the TN mode. If a voltage applied to the liquid crystal panel 107 is changed in accordance with a TV video signal, a TV image is displayed on the liquid crystal panel 107.

With this arrangement of the optical system, the light source beam 130 transmitted through the condenser lens 103 is incident on the incident surface of the liquid crystal panel 107 at the inclination $\theta$ with respect to the axis perpendicular to the incident surface thereof. The light source beam is further inclined by the second mirror 108 at the angle $\alpha$ and is incident on the front lens 109b of the projection lens 109 at the inclination $\beta$ ($\theta + \alpha$). Since the liquid crystal panel 107 and the projection lens 109 are arranged on the optical axes 160 and 110 while they are offset, 100% of a light source beam can be projected.

In addition, since the front lens 109b of the projection lens 109 and the screen 20 are arranged to be inclined from each other by the angle $\alpha$, the liquid crystal panel 107, the projection lens 109 including the front and rear lenses 109b and 109c, and the screen 120 are arranged to be parallel with each other on the optical axis 160 inclined at the angle $\theta$. With this arrangement, the distances from the respective portions of the liquid crystal panel 107 to the screen 120 through the projection lens 109 become the same. Therefore, the image beam from the liquid crystal panel 107 is projected, as a projected image beam 111 having no trapezoidal distortion or focusing error, on the screen 120.

In the above embodiment, the image beam 104 is formed by using one liquid crystal panel 107. However, when R, G, and B images are formed by the respective liquid crystal panels and are mixed with each other, the composite image beam is reproduced, as a color image, on the screen 120 through the projection lens 109.

With the above-described arrangement, even if the liquid crystal projection apparatus is installed on a floor or suspended from a ceiling to project an image on the screen from below or above, an image free from luminance variations, trapezoidal distortion, and a focusing error can be obtained.

In addition, since the base line or upper line of a projected image can be set to be horizontal, installation adjustment is facilitated, thereby providing an easy-to-use liquid crystal projection apparatus.

Furthermore, since the directions of incident light and projected light are set to oppose each other, and the mirrors for this setting are arranged in the projection lens, the overall size of the apparatus and the projection distance can be reduced.

Figure 14:
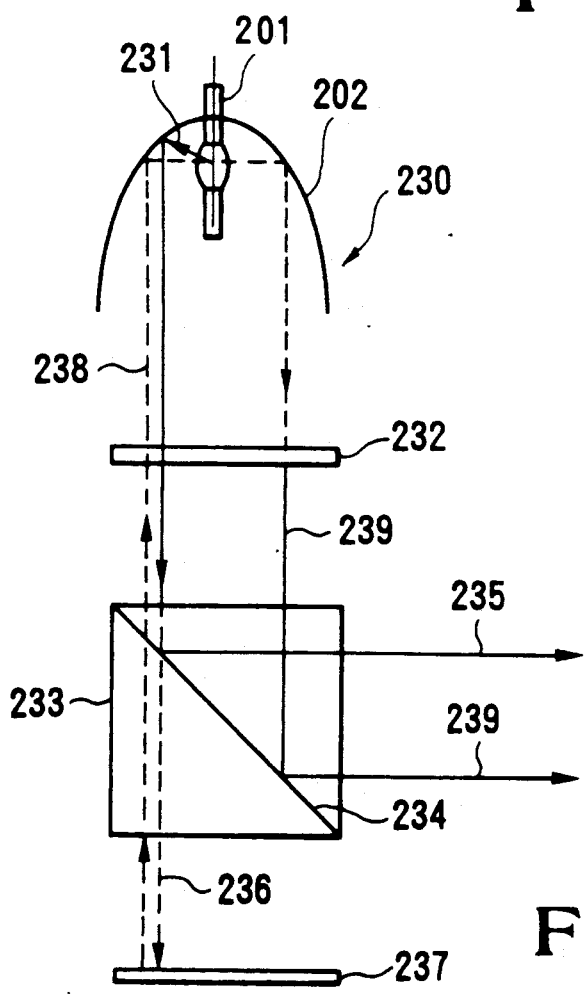
FIG. 14 is a view showing the arrangement of a liquid crystal color projection apparatus according to still another embodiment of the present invention.
Figure 15:
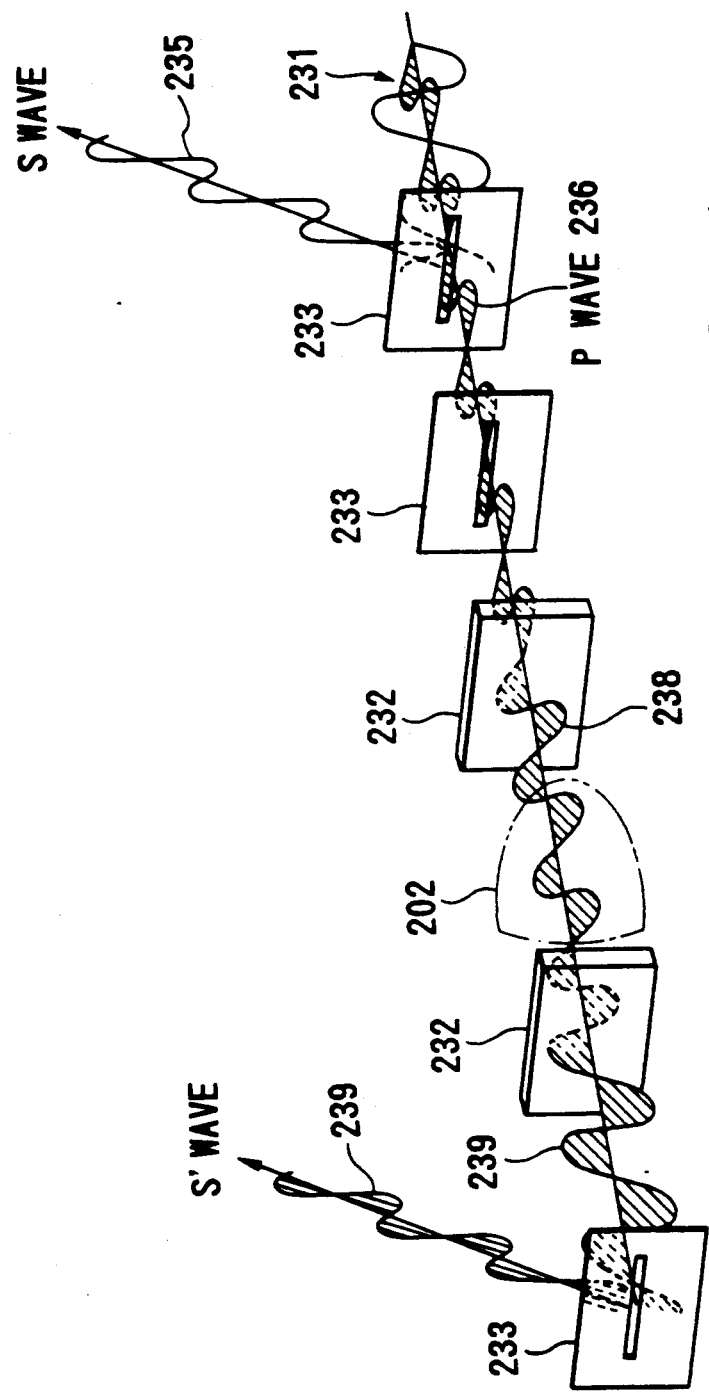
FIG. 15 is a view for explaining a transmission state of polarized beams in the apparatus in FIG. 14.

FIG. 14 shows a polarizing light source apparatus according to still another embodiment of the present invention. FIG. 15 is a view for explaining a transmission state of polarized beams in FIG. 14. Referring to FIGS. 14 and 15, reference numeral 230 denotes a light source means; 232, a linear polarization rotating means; 233, a polarized beam splitting means; and 237, a reflecting means. A polarizing light source apparatus is constituted by these components. The light source means 230 includes an arc lamp 201 and a reflector 202 having a reflecting surface consisting of a parabolic surface. Natural light 231 emitted from the arm lamp 201 is focused by the reflector 202 to be substantially parallel to the optical axis and is subsequently incident on the linear polarization rotating means 232. The linear polarization rotating means 232 serves to rotate only linearly polarized light clockwise without influencing the natural light. As the linear polarization rotating means 232, an optical crystal such as a quartz plate for rotating the direction of polarization through 45° by changing the phase of transmitted light by using the birefringence of a medium or a λ/4 plate consisting of a polyvinyl alcohol film which is extended to cause birefringence is used. Therefore, the natural light 231 incident on the linear polarization rotating means 232 is transmitted therethrough. The natural light 231 transmitted through the linear polarization rotating means 232 is incident on the polarized beam splitting means 233 to be split into a reflected linearly polarized beam (S wave) 235 indicated by a solid line in FIG. 14 and a transmitted linearly polarized beam (P wave) 236 indicated by a dotted line in FIG. 14 (corresponding to a waveform indicated by hatching in FIG. 15). The S wave 235 is reflected in a direction perpendicular to the optical axis of the natural light 231, whereas the P wave 236 is transmitted. The polarizing beam splitting means 33 is formed by depositing a dielectric multilayer film 234 on the inclined surface of one of two rectangular prisms, and bonding the inclined surfaces of the rectangular prisms to each other. A beam transmitted through the inclined surfaces is a P-polarized beam, and a beam reflected by the inclined surfaces is an S-polarized beam.

The P wave 236 transmitted through the polarized beam splitting means 233 is reflected by the reflecting means 237, constituted by, e.g., a total reflection mirror arranged to be perpendicular to the optical axis of the P wave, at an angle of 180°. As a result, the P wave 236 is incident on and transmitted through the polarized beam splitting means 233 through the same optical path so as to be incident on the linear polarization rotating means 232. The phase of the P wave 236 is not changed even after it is reflected by the reflecting means 37 or is transmitted through the polarized beam splitting means 233 again. If, however, the P wave 236 is incident on the linear polarization rotating means 232, its phase is rotated clockwise through 45° owing to the characteristics of the linear polarization rotating means 232 to become a P wave 238. The P wave 238 is then transmitted through the linear polarization rotating means 232 and is reflected at 180° by the reflector 202 without changing its phase. As a result, the P wave 238 returns to the linear polarization rotating means 232 to be incident thereon.

The P wave 238 as the linearly polarized beam rotated through 45°, which is incident on the linear polarization rotating means 232 again, is further rotated clockwise through 45° to become a linearly polarized beam 239 having the same phase as that of the S wave 235, i.e., a linearly polarized beam obtained upon phase rotation through 90° with respect to the P wave 236. The linearly polarized beam 239 is incident on the polarized beam splitting means 233 and is reflected in a direction perpendicular to the optical axis of the natural light 231. The reflected beam 239 is then mixed with the previously split S wave 235 on the same optical axis. Therefore, all the natural light 31 emitted from the light source means 230 can be extracted as a reflected linearly polarized beam (S wave) without a loss, and the amount of light incident on each liquid crystal panel can be increased twice. In addition, since no polarizing plate is required, the problem of a deterioration of a polarizing plate due to heat can be solved.

Figure 16:
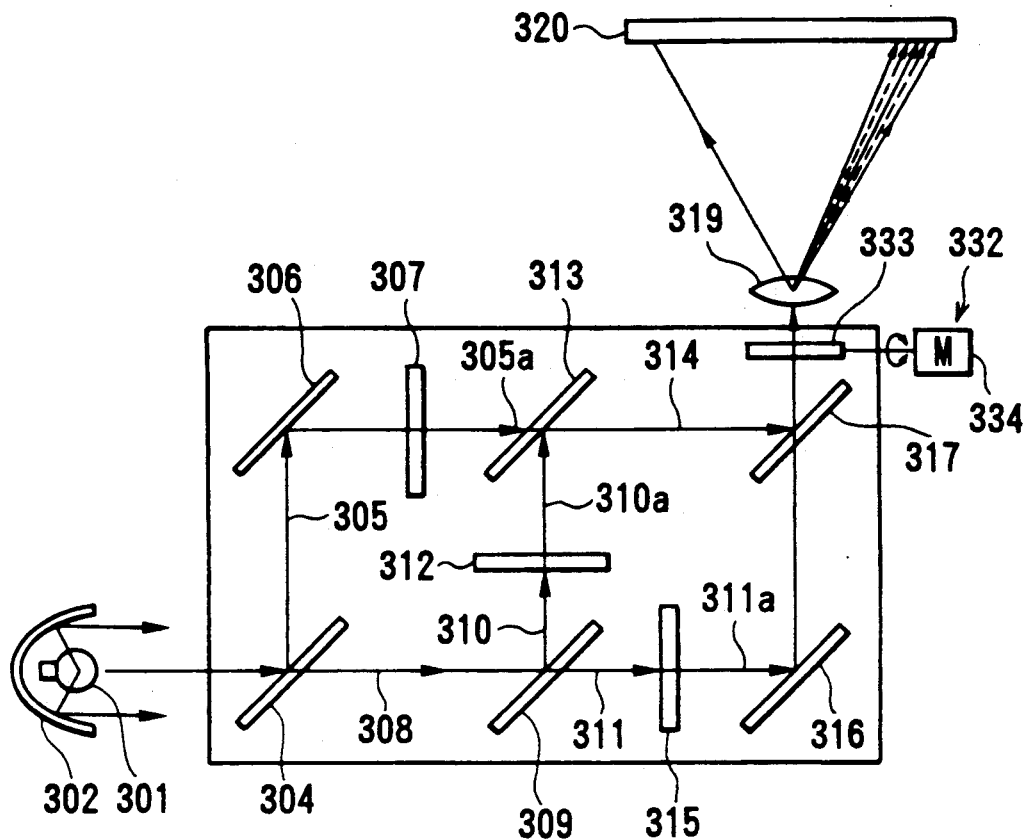
FIG. 16 is a view showing the arrangement of a liquid crystal color projection apparatus according to still another embodiment of the present invention.
Figure 17:
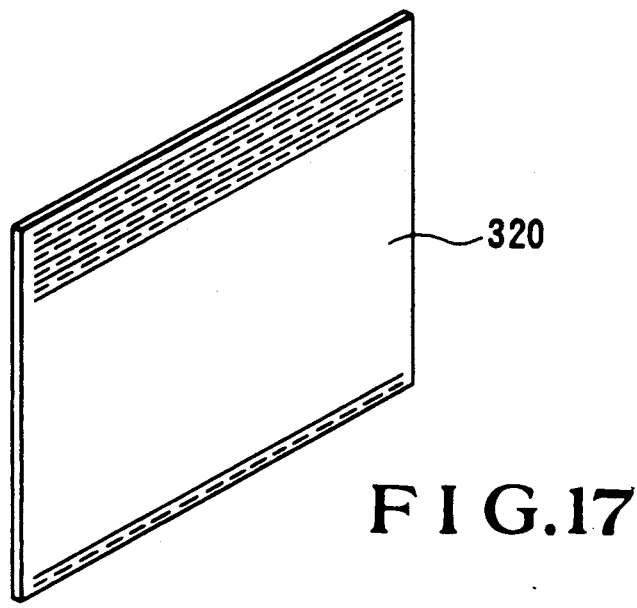
FIG. 17 is a view showing odd field display and even field display on a screen.
Figure 18:
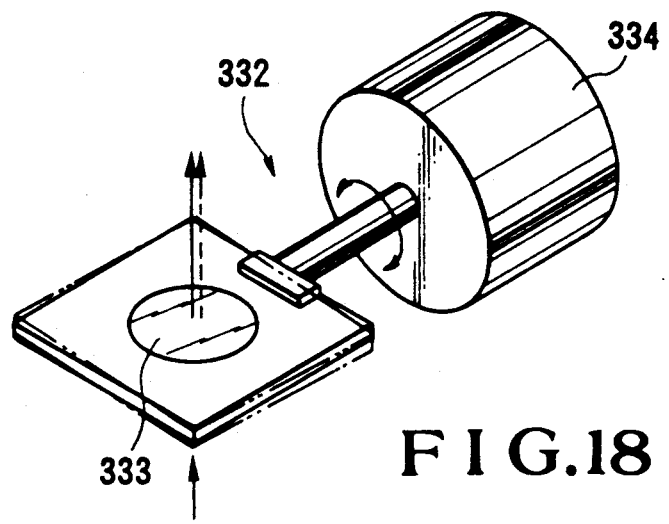
FIG. 18 is a perspective view showing an optical interlace unit.

FIG. 16 shows a liquid crystal panel projection apparatus according to still another embodiment of the present invention. FIG. 17 shows odd field display and even field display on a screen. FIG. 18 shows an optical interlace unit. Referring to FIGS. 16 to 18, in this embodiment, a mixing dichroic mirror 331 for reflecting a magenta image beam 314 and transmitting a green image beam 311a is arranged in an optical path between a projecting optical system 319, a mirror 316, and a mixing dichroic mirror 313, and an optical interlace unit 332 is arranged in an optical path between the projecting optical system 319 and the mixing dichroic mirror 331. Other arrangements are the same as those in FIG. 2.

Figure 19:
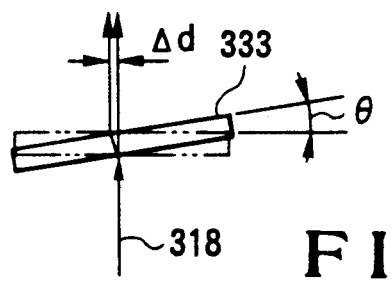
FIG. 19 is a view showing the inclination of a flat plate glass and the movement of its optical axis.

The optical interlace unit 332 comprises an optical flat plate glass 333 arranged in the optical path to be perpendicular to the optical axis, and a driving source 34 such as a torque motor for swinging/operating the optical flat plate glass 333 in the optical path between two predetermined angles corresponding to odd and even fields in synchronism with a field signal. The thickness, refractive index, and inclination $\theta$ (see FIG. 19) of the flat plate glass 333 are selected to obtain a distance $\Delta d$ required to position the optical axis between the rasters of projected images. When the flat plate glass 333 is inclined by the angle $\theta$, a composite color image beam 18 is transmitted/refracted through the flat plate glass 333 to be translated by the distance $\Delta d$.

In the liquid crystal panel projection apparatus having such an arrangement, each of liquid crystal panels 7, 12, and 15 has an pixel arrangement of about 240 (V) lines ×400 (H) pixels, and perform non-interlaced display in accordance with a field signal of a standard TV signal. If the flat plate glass 333 is swung by the driving source 334 in synchronism with the field signal to be inclined at a predetermined angle, the optical axis can be translated vertically along the screen 320 by a distance corresponding to ½ a pixel. Therefore, the apparent number of pixels on the screen 320 can be increased twice the 240 (V) lines, and interlaced display with 480 (V) lines can be realized.

Figure 20:
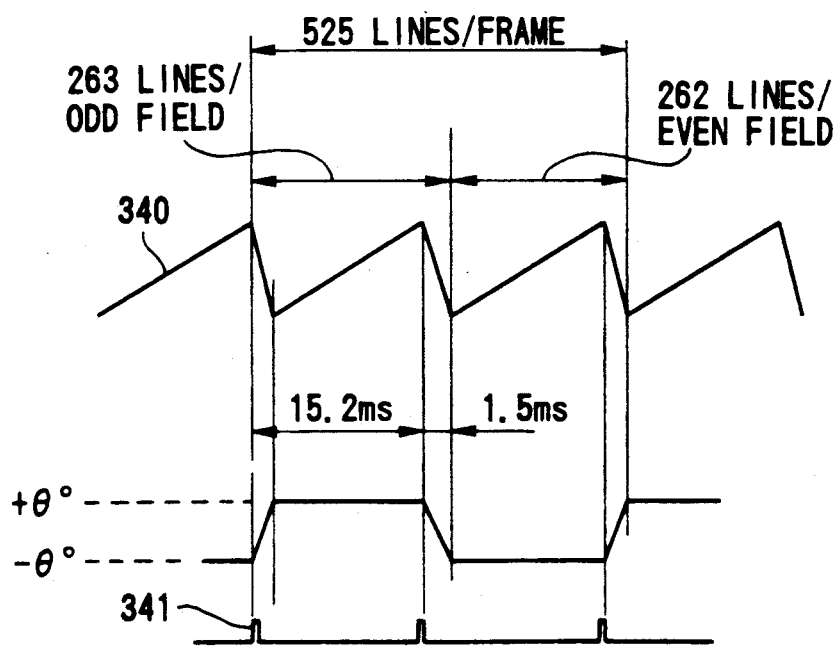
FIG. 20 is a view showing the relationship between the timing chart of a standard television signal, the inclination of the flat plate glass, and a field sync signal.

FIG. 20 shows the relationship between the timing chart of a standard TV signal, the inclination of the flat plate glass 333, and a field sync signal. Reference numeral 40 denotes a TV vertical deflection signal. In this case, one frame is constituted by 525 lines. Of one frame, an odd field has 263 scanning lines. Of these scanning lines, 240 lines are effective scanning lines. An even field has 262 scanning lines. The flat plate glass 333 is operated in synchronism with a field signal during a V blanking period (1.5 ms) every time odd and even fields are switched.

Figure 21:
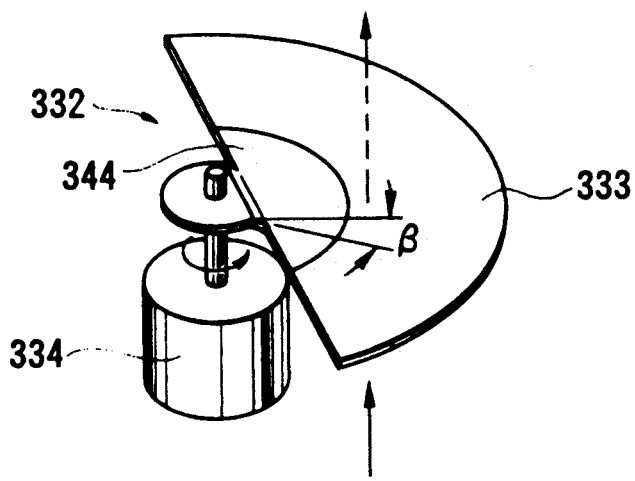
FIG. 21 is a perspective view showing another optical interlace unit.

FIG. 21 shows another optical interlace unit. In this case, a semicircular optical flat plate glass 333 is attached to a semicircular plate 344 and is rotated with the plate 344 by a driving source 334 such as a step motor, thus moving the flat plate glass into or out of the optical path for substantially every ½ rotation. The flat plate glass 333 is inclined from the optical axis by an angle $\beta$ corresponding to either an odd field or an even field.

In the optical interlace unit 332 having such an arrangement, similar to the above-described unit, when the flat plate glass 333 is rotated and inserted in the optical path, the optical axis can be moved vertically on the screen by a distance corresponding to ½ a pixel in synchronism with a field sync signal. Therefore, the same effect as in the above-described embodiment can be obtained.

Figure 22:
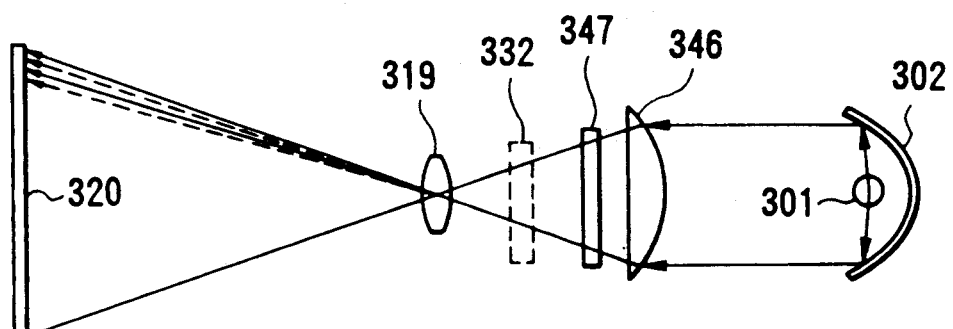
FIG. 22 is a view showing the arrangement of a liquid crystal color projection apparatus according to still another embodiment of the present invention.

FIG. 22 shows still another embodiment of the present invention. In this embodiment, one monochrome liquid crystal panel (or a color liquid crystal panel) is used. Reference numeral 46 denotes a condenser lens; and 47, a monochrome liquid crystal panel.

With the above-described arrangement, the apparent number of pixels can be increased twice that of a conventional apparatus, and sufficiently high screen brightness can be ensured. Therefore, an inexpensive liquid crystal panel can be used without any modification, and the arrangement of an optical interlace unit can be simplified, thereby providing a low-cost liquid crystal panel projection apparatus.

In the above-described embodiments, source light is separated into the three color beams by the dichroic mirrors. However, a dichroic prism may be used for the same purpose.

What is claimed is:

1. A liquid crystal color projection apparatus comprising:
   a light source;
   dichroic mirrors for separating light, supplied from said light source, into red, green, and blue beams;
   transmission type liquid crystal panels, respectively arranged on optical paths of the three color beams separated by said dichroic mirrors, for forming images corresponding to the three color beams;
   beam mixing means for mixing image beams from said transmission liquid crystal panels to reproduce a color image;
   at least two parallel side plates having plural pairs of engaging portions, arranged at symmetrical positions, for fixing said dichroic mirrors and said liquid crystal panels at predetermined positions; and
   bar members, each having two end portions fixed to one pair of engaging portions of said side plates, for fixing and holding two arbitrary end portions of each of said dichroic mirrors and said liquid crystal panels thereon.

2. An apparatus according to claim 1, wherein said dichroic mirrors and said liquid crystal panels are fixed to said bar members such that incident surfaces, of said dichroic mirrors and said liquid crystal panels, on which light from said light source is incident, are in direct contact with said bar members.

3. An apparatus according to claim 1, wherein said dichroic mirrors and said liquid crystal panels are fixed to said bar members with a pair of fastening metal plates clamping said bar members.

4. An apparatus according to claim 1, wherein said bar members are round bars.

5. An apparatus according to claim 1, wherein said beam mixing means is a dichroic mirror.

6. An apparatus according to claim 1, wherein said beam mixing means is a dichroic prism.

7. An apparatus according to claim 1, further comprising a projection mirror for reflecting the image beam from said beam mixing means at a predetermined angle $\alpha$ within the same plane of incidence, and a projection lens whose axis is inclined by the angle $\alpha$ to allow the beam reflected by said projection mirror to be incident at a predetermined incident angle $\theta$, and wherein said respective liquid crystal panels are inclined to allow the three color beams from said dichroic mirrors to be incident on panel surfaces of said liquid crystal panels at the predetermined incident angle $\theta$.

8. An apparatus according to claim 7, further comprising a screen mounted while an end portion thereof located in an inclination direction of the angle $\alpha$ is inclined toward said projection lens at an angle equal to the angle $\alpha$.

9. An apparatus according to claim 8, wherein the optical paths of the three color beams from said dichroic mirrors are inclined at an angle not more than an angle corresponding to an inclination, obtained by dividing a distance corresponding to ½ an image projected at a predetermined position on said screen by a projection distance, with respect to an axis perpendicular to the panel surface of each of said liquid crystal panels, and said projection mirror is inclined at the angle $\alpha$ to set a base line or an lower line of a projected image to be horizontal with respect to lens center.

10. An apparatus according to claim 7, wherein said projection lens comprises an L-shaped mirror barrel and front and rear lenses respectively fitted in two opening portions of said mirror barrel, said projection mirror is arranged at a bent portion of said L-shaped mirror barrel, said rear lens is inclined at the predetermined angle in the same inclination direction of each of said liquid crystal panels with respect to the optical path of the image beam transmitted through each of said liquid crystal panels, and the center of said front lens is inclined at the predetermined angle in the same inclination direction of each of said liquid crystal panels with respect to an optical path of a beam reflected by said projection mirror.

11. An apparatus according to claim 1, further comprising a holding member, having fixing portions respectively extending from said side plates, for fixing and holding two end portions of an incident surface of each of said liquid crystal panels to said bar members to be slidable in a direction parallel to said bar members, and brackets arranged to oppose said fixing portions of said holding member and fixed to said side plates after said liquid crystal panels are moved and adjusted in directions perpendicular and parallel to said bar members.

12. An apparatus according to claim 11, wherein tongue pieces are formed at two end portions of said holding member to form gaps between said tongue pieces and a main body of said holding member so as to insert said bar members therein.

13. An apparatus according to claim 1, wherein said beam mixing means is constituted by first mixing means for partially mixing the separated three color beams, and second mixing means for performing final mixing of the three color beams.

14. An apparatus according to claim 1, further comprising a parallax correcting plate arranged in the optical path of each of the three color beams to equalize the numbers of times that the separated three color beams are transmitted through said beam mixing means.

15. An apparatus according to claim 14, wherein a mixing/projecting optical system for the separated three color beams is arranged such that the number of times of transmission by said beam mixing means is set to be not more than one, and said parallax correcting plate is arranged in an optical path in which the number of times of transmission is 0.

16. An apparatus according to claim 14, wherein said parallax correcting plate is constituted by a transparent plate consisting of the same material as that for said beam mixing means and having the same thickness as that thereof, and is arranged in the same direction as that of said beam mixing means and at the same inclination as that thereof.

17. An apparatus according to claim 14, wherein said parallax correcting plate is arranged at an angle smaller than an angle at which said beam mixing means is arranged.

18. An apparatus according to claim 14, wherein said parallax correcting plate has a thickness larger than that of said beam mixing means.

19. An apparatus according to claim 14, wherein said parallax correcting plate has a refractive index larger than that of said beam mixing means.

20. An apparatus according to claim 1, further comprising a reflector arranged in said light source having a reflecting surface comprising a parabolic surface, polarized beam splitting means, arranged on an optical axis of a parallel focused beam from said light source, for splitting the focused beam into a transmitted linearly polarized beam and a reflected linearly polarized beam, reflecting means for reflecting the transmitted linearly polarized beam at 180° to cause the transmitted linearly polarized beam to be incident on said beam splitting means again, and linear polarization rotating means for rotating, through 45°, a polarizing direction of a transmitted linearly polarized beam which is reflected by said reflecting means at 180° again and transmitted through said polarized beam splitting means again.

21. An apparatus according to claim 20, wherein said linear polarization rotating means is arranged between said light source and said polarized beam splitting means to be perpendicular to an optical axis, and when the transmitted linearly polarized beam whose polarization direction is rotated through 45° by said linear polarization rotating means is reflected at 180° by said reflector to be incident on and transmitted through said linear polarization rotating means again, the polarization direction is further rotated through 45°, and the transmitted linearly polarized beam is incident on said polarized beam splitting means to be reflected in a direction perpendicular to the optical axis of the natural light so as to be mixed with the reflected linearly polarized beam.

22. An apparatus according to claim 1, wherein each of said liquid crystal panels is arranged to perform non-interlaced display in accordance with a field signal of a standard TV signal, and said apparatus further comprises an optical interlace unit, arranged in an optical path extending from said liquid crystal panel, for translating the optical axis by a predetermined amount in synchronism with the field signal.

23. An apparatus according to claim 22, wherein said optical interlace unit comprises an optical flat plate glass and a driving source for reciprocating said flat plate glass in the optical path between two predetermined angles corresponding to an odd field and an even field in synchronism with the field signal.

24. An apparatus according to claim 22, wherein said optical interlace unit comprises an optical glass inclined by an angle corresponding to either an odd field or an even field, and a driving source for rotating said glass in synchronism with the field signal to move said glass into and out of the optical path.

25. A liquid crystal projection apparatus comprising:
a light source;
a transmission type liquid crystal panel for receiving light from said light source and generating an image;
two parallel side plates having plural pairs of engaging portions, arranged at symmetrical positions, for fixing said liquid crystal panel at a predetermined position; and
a bar member, having two ends fixed to one of said pairs of engaging portions of said side plates, for fixing and holding two arbitrary end portions of a dichroic mirror and those of said liquid crystal panel.

26. A liquid crystal projection apparatus comprising:
a pair of side plates arranged parallel to sandwich optical components such as a liquid crystal panel;
a pair of bar members, each having two ends held by said side plates;
a holding member, having fixing portions extending from said side plates, for fixing and holding two end portions of an incident surface of said liquid crystal panel on said bar members so as to allow said liquid crystal panel to be slidable in a direction parallel to said bar members; and
brackets arranged to oppose said fixing portions of said holding member and fixed to said side plates after said liquid crystal panel is moved and adjusted in directions perpendicular and parallel to said bar members.

27. A liquid crystal color projection apparatus comprising:
a light source;
dichroic mirrors for separating light, supplied from said light source, into red, green, and blue beams;
transmission type liquid crystal panels, respectively arranged on optical paths of the three color beams separated by said dichroic mirrors, for forming images corresponding to the three color beams;
beam mixing means for mixing image beams from said transmission liquid crystal panels to reproduce a color image; and
a parallax correcting plate arranged in the optical path of at least one of the three color beams to equalize the numbers of times that the separated three color beams are transmitted through said beam mixing means.

28. A liquid crystal projection apparatus comprising:
light source means including a reflector having a reflector surface comprising a parabolic surface;
polarized beam splitting means, arranged on an optical axis of a parallel focused beam from said light source means, for splitting the focused beam into a transmitted linearly polarized beam and a reflected linearly polarized beam;
reflecting means for reflecting the transmitted linearly polarized beam at 180° to cause the transmitted linearly polarized beam to be incident on said beam splitting means again; and
linear polarization rotating means for rotating, through 45°, a polarizing direction of a transmitted linearly polarized beam which is reflected by said reflecting means at 180° again and transmitted through said polarized beam splitting means again,
wherein said linear polarization rotating means is arranged between said light source means and said polarized beam splitting means to be perpendicular to an optical axis, and when the transmitted linearly polarized beam whose polarization direction is rotated through 45° by said linear polarization rotating means is reflected at 180° by said reflector to be incident on and transmitted through said linear polarization rotating means again, the polarization direction is further rotated through 45°, and the transmitted linearly polarized beam is incident on said polarized beam splitting means to be reflected in a direction perpendicular to the optical axis of the natural light so as to be mixed with the reflected linearly polarized beam.

29. A liquid crystal projection apparatus comprising:

a light source;

a liquid crystal panel as an image display carrier for receiving light from said light source and generating a plane image subjected to non-interlaced display in accordance with a field signal of a standard TV signal;

a projection lens for enlarging and projecting an image beam from said liquid crystal panel on a screen; and an optical interlace unit, arranged in an optical path extending from said liquid crystal panel, for translating in parallel an optical axis of said plane image beam by ½ a pitch of a horizontal scanning line in synchronism with the field signal.

* * * * *